US012644262B1

(12) United States Patent
Liu et al.

(10) Patent No.: US 12,644,262 B1
(45) Date of Patent: Jun. 2, 2026

(54) OVERHEAD SHOWER ARM WITH SHOWERHEAD HOLDER

(71) Applicant: Xiamen Rainshower Co. Ltd., Xiamen (CN)

(72) Inventors: Hewei Liu, Xiamen (CN); Zhanglong Jiang, Xiamen (CN); Zhengqi Zhu, Xiamen (CN); Ruiqiang Zhang, Xiamen (CN)

(73) Assignee: Xiamen Rainshower Co. Ltd., Xiamen (CN)

( * ) Notice: Subject to any disclaimer, the term of this patent is extended or adjusted under 35 U.S.C. 154(b) by 0 days.

(21) Appl. No.: 19/364,690

(22) Filed: Oct. 21, 2025

(30) Foreign Application Priority Data

Sep. 11, 2025 (CN) ........................ 202511298203.8

(51) Int. Cl.
*E03C 1/04* (2006.01)
*B05B 15/62* (2018.01)
*E03C 1/02* (2006.01)

(52) U.S. Cl.
CPC ............ *E03C 1/0408* (2013.01); *B05B 15/62* (2018.02); *E03C 2001/026* (2013.01)

(58) Field of Classification Search
CPC ................ E03C 1/0408; E03C 1/0409; E03C 2001/026; B05B 1/18; B05B 1/182; B05B 1/185; B05B 1/188; B05B 1/189; B05B 1/1896; B05B 15/60; B05B 15/62; B05B 15/65; B05B 15/652; B05B 15/654; B05B 15/658; A47K 3/28
See application file for complete search history.

(56) References Cited

U.S. PATENT DOCUMENTS

| | | | | |
|---|---|---|---|---|
| 7,299,510 | B2 | 11/2007 | Tsai | |
| 10,632,480 | B2 * | 4/2020 | Yu | B05B 1/30 |
| 11,898,335 | B2 * | 2/2024 | Ni | E03C 1/066 |
| 12,269,049 | B1 | 4/2025 | Yan | |
| 12,352,023 | B1 * | 7/2025 | Yan | E03C 1/0409 |
| 12,421,702 | B1 * | 9/2025 | Yan | E03C 1/0408 |
| 12,534,891 | B1 * | 1/2026 | Yan | E03C 1/0408 |
| 2020/0122166 | A1 * | 4/2020 | Farley | B05B 15/62 |
| 2020/0129995 | A1 * | 4/2020 | Zhadanov | B05B 1/1636 |

(Continued)

FOREIGN PATENT DOCUMENTS

| | | | |
|---|---|---|---|
| CN | 215858027 | U | 2/2022 |
| CN | 222962175 | U | 6/2025 |

(Continued)

*Primary Examiner* — Darren W Gorman

(57) ABSTRACT

An overhead shower arm assembly with a shower head holder includes an arm, a seat body, and an actuator. The arm has a rear water inlet joint connectable to a wall-mounted water outlet tube, a first water outlet joint at a top portion for an overhead shower head, and a downward and forward opening installation cavity at a lower portion. The seat body is fixed within the cavity and provided with a first water flow coupling, a second water flow coupling, and a second water outlet joint. A water path switching spool is arranged between the first and second water flow couplings and the second water outlet joint, and the actuator disposed on a side of the arm drives the spool to control water distribution. A shower head holder is arranged at a front portion of the seat body for detachably receiving a handheld shower head.

17 Claims, 20 Drawing Sheets

(56) References Cited

U.S. PATENT DOCUMENTS

| | | | | |
|---|---|---|---|---|
| 2023/0175240 A1* | 6/2023 | Yan | E03C 1/0408 239/281 |
| 2024/0009688 A1* | 1/2024 | Clarke | E03C 1/0409 |
| 2025/0333938 A1* | 10/2025 | Wang | E03C 1/0408 |

FOREIGN PATENT DOCUMENTS

| | | | | |
|---|---|---|---|---|
| KR | 200451254 Y1 * | 12/2010 | | B05B 1/18 |
| WO | WO-2020183501 A1 * | 9/2020 | | E03C 1/0408 |

* cited by examiner prior art

A-A

OVERHEAD SHOWER ARM WITH SHOWERHEAD HOLDER

CROSS REFERENCE TO RELATED APPLICATIONS

This application is based upon and claims priority to Chinese Patent Application No. 2025112982038, filed on Sep. 11, 2025, the entire contents of which are incorporated herein by reference.

FIELD

This application relates to the field of shower equipment, and more particularly to an integrated shower arm for connecting an overhead shower head and a handheld shower head.

BACKGROUND

A conventional integrated shower arm (U.S. Pat. No. 12,269,049B1), as shown in FIG. 1, has been disclosed. The arm body 1 includes a shell 101, a surface cover 102, and a water passing plate 103. The upper side of the surface cover 102 is fitted with an overhead shower coupling 12 for connecting to an overhead shower head. A shower head holder 3 is fixedly arranged at the lower side of the surface cover 102. According to the embodiment disclosed in the patent document, a handheld shower head is fixed to the shower head holder 3 by magnetic attraction. A middle part of the shell 101 is provided with a diverter seat 11. The diverter seat 11 is provided with a diverter cavity 112. A spool body 21 of the diverter spool 2 is rotatably inserted into the diverter cavity 112. A handheld shower coupling 211 for connecting to the handheld shower head is provided at one end of the spool body 21. By rotating the diverter spool 2, a water inlet port 111 of the diverter seat 11 selectively comes into communication with the overhead shower coupling 12 and/or the handheld shower coupling 211. With this structure, the diverter seat 11 is located in the middle part of the shell 101, and the water inlet port 111 of the diverter seat 11 is designed to connect to an outlet tube installed on the wall, therefore, the diverter seat 11 is relatively high off the ground. The diverter spool 2 is arranged in the diverter seat 11, and its switching handle 24 is located on the side of the shell 101 opposite the surface cover 102. When a person stands below the shower arm, his or her view of observing the handle 24 is prone to being blocked by the arm body 1, making it difficult to rotate the handle 24. Furthermore, the diverter spool 2's high lever off the ground makes it inconvenient for children or a short person to use.

In view of the above problems, the inventors conducted in-depth research to address the aforementioned deficiencies in the prior art, and thus, the present application was developed.

SUMMARY

The present application aims to provide an overhead shower arm with a shower head holder that facilitates the user's waterway switching.

To achieve this objective, the present application discloses an overhead shower arm with a shower head holder, it comprises: an arm, provided with a water inlet joint at its rear portion for connecting to a wall-mounted water outlet tube, wherein the arm is configured to be vertically mounted on the water outlet tube; a first water outlet joint for connecting to an overhead shower head is provided at a top portion of the arm, and an installation cavity with an opening, that opens downward and forward, is formed at a bottom portion of the arm;

a seat body, fixedly arranged within the installation cavity, wherein a first water flow coupling and a second water flow coupling are equipped at a top of the seat body, and a second water outlet joint is arranged at a bottom of the seat body; and a water path switching spool is arranged between the first water flow coupling, the second water flow coupling, and the second water outlet joint, and a shower head holder is arranged at a front portion of the seat body, for detachably receiving a handheld shower head; and an actuator, arranged on a side of the arm and connected to the water path switching spool, wherein a first water passage and a second water passage are further formed in an inner cavity of the arm, one end of the first water passage is in fluid communication with the water inlet joint, the other end of the first water passage is in fluid communication with the first water flow coupling, one end of the second water passage is in fluid communication with the first water outlet joint, and the other end of the second water passage is in fluid communication with the second water flow coupling, the water path switching spool is driven by the actuator to selectively fluidly communicate the first water flow coupling with the second water flow coupling or the second water outlet joint, or communicate the first water flow coupling with both the second water flow coupling and the second water outlet joint.

With the above-described structure, the actuator is positioned at a lower side part of the arm, and is relatively low off the ground, so the user's view is not prone to being obstructed by the arm. This facilitates the user's operation on the actuator, thereby actuating the waterway switching spool to switch the arm's waterway.

Further, the present application discloses an overhead shower arm with a shower head holder, wherein a filter element is connected in series with the arm in the first water passage, to allow all water flowing from the water inlet joint to the first water flow coupling to be filtered by the filter element.

In some examples, the arm is composed of a front shell and a rear shell, and has a hollow inner cavity, a cylindrical body is horizontally arranged at a rear part of the rear shell, one end of the cylindrical body is an open end, and an other end of the cylindrical body is a closed end, a water baffle is provided in the cylindrical body on a side close to the closed end, such that a first water holding chamber is formed between the water baffle and the closed end of the cylindrical body, the water baffle is provided with at least a first water flow hole, the filter element is disposed into the cylindrical body through the open end, one end of the filter element facing the water baffle is a water inlet end, and an other end is a water outlet end, a screw cap seals the open end of the cylindrical body, to allow a space of the cylindrical body for placing the filter element to be defined as a second water holding chamber, a second water flow hole is provided in a tubular wall of the second water holding chamber, a water receiving channel is further provided in the rear shell, one end of the water receiving channel is connected to the second water flow hole, and an other end of the water receiving channel is connected to the first water flow coupling; the water inlet joint is convexly arranged on an outer wall of the cylindrical body opposite to the front shell, and the water flowing in through the water inlet joint flows through the first water holding chamber into the water inlet end of the filter element, and then flows out through the water outlet end of the filter element into the second water holding chamber, flows through the second water flow hole into the water receiving channel, and finally flows into the first water flow coupling; and the first water holding chamber, the first water flow hole of the water baffle, the second water holding chamber, the second water flow hole, and the water receiving channel together constitute the first water passage. This structure facilitates quick replacement of the filter element of the overhead shower arm.

DETAILED DESCRIPTION OF EMBODIMENTS

In the description of the present invention, it should be understood that the terms "front" and "rear" are consistent with the directions in the accompanying drawings. However, they are only used to facilitate the description of the present invention so that ordinary technicians can better understand the relative positional relationship between components when reading the specification. They do not indicate or imply that the devices or components referred to must have a specific orientation, be constructed and operate in a specific orientation. Therefore, they should not be understood as limiting the present invention.

Figure 3A:
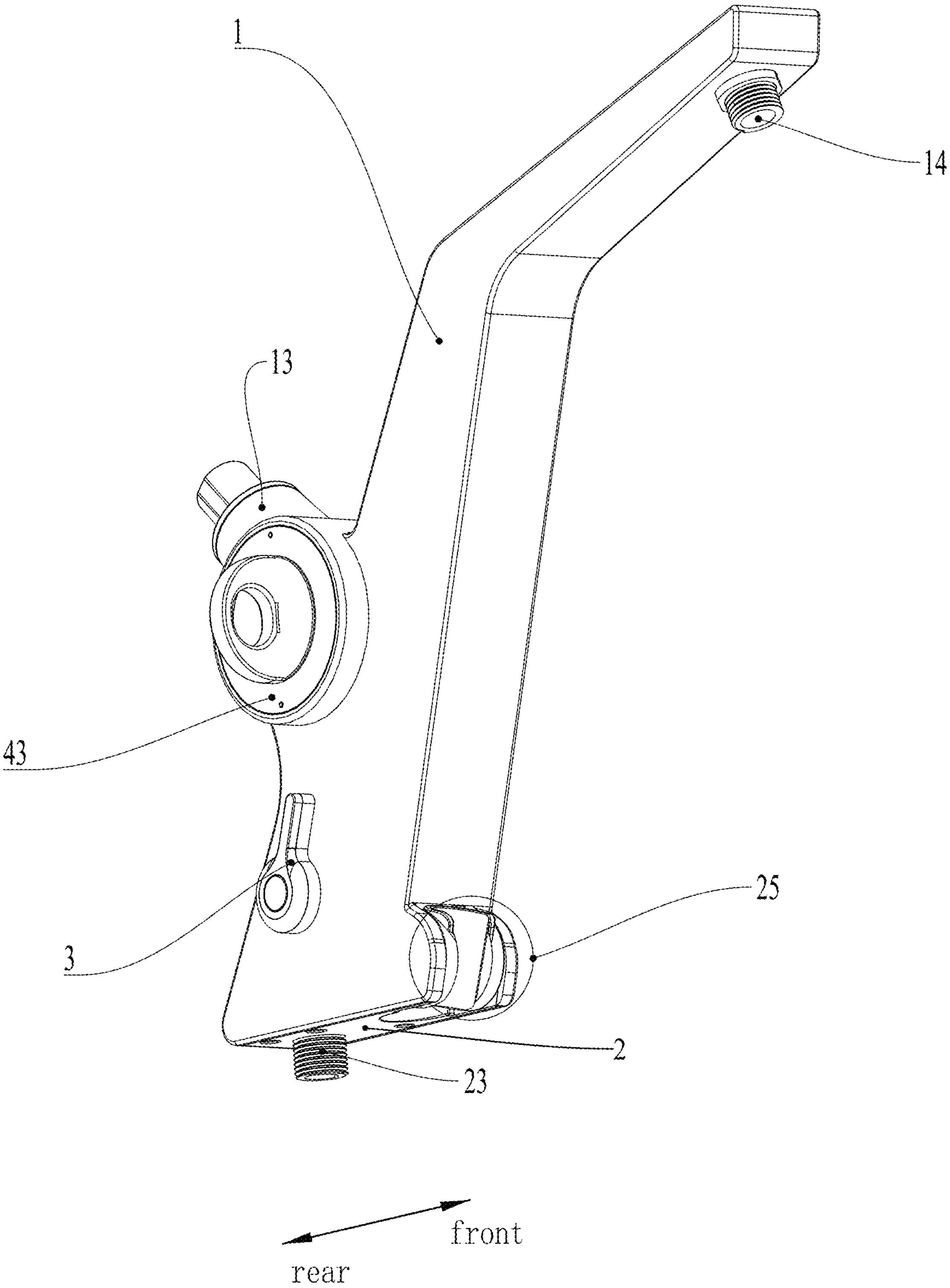
FIG. 3*a* is a perspective view of an overhead shower arm of the present application with a filter cartridge.
Figure 3B:
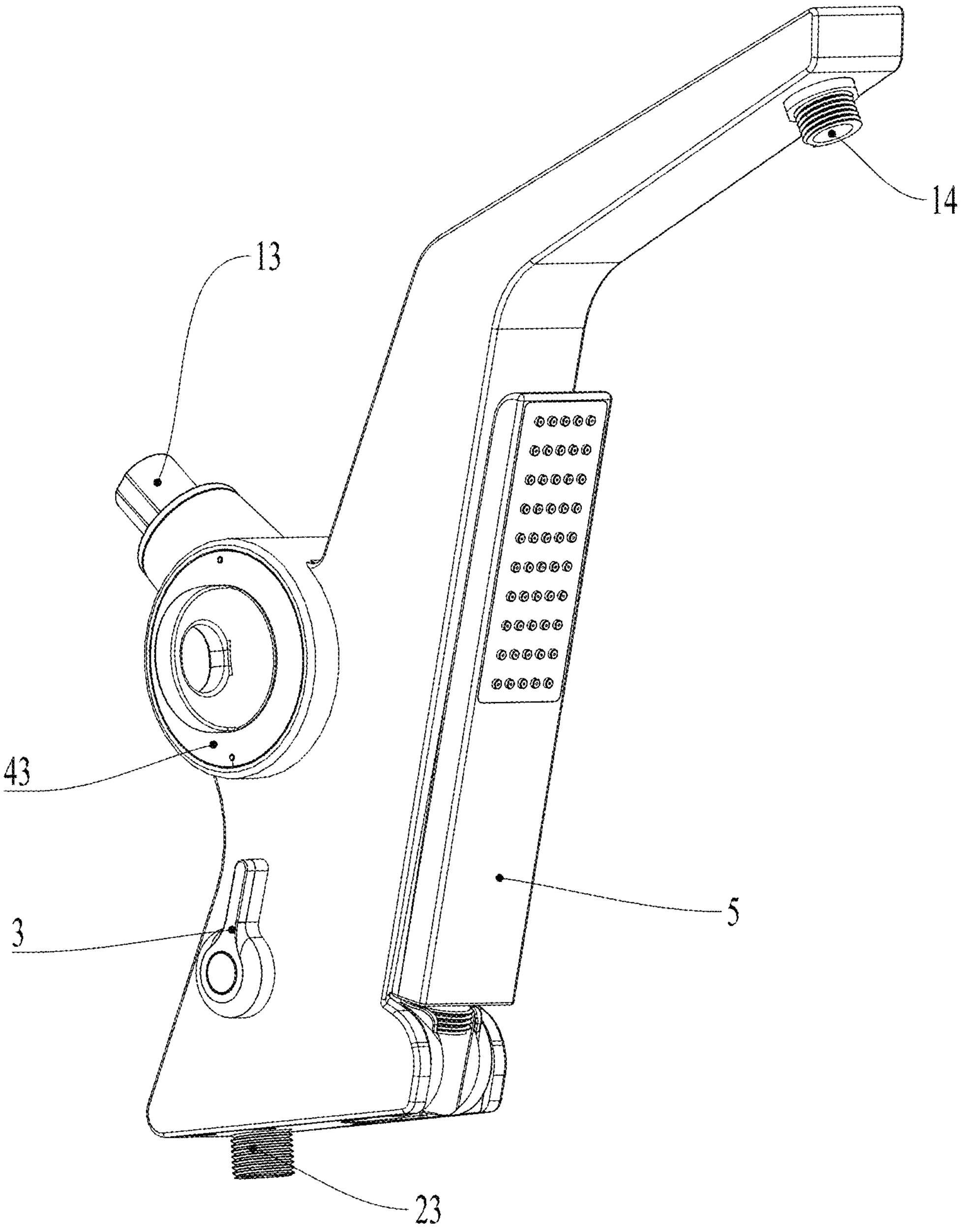
FIG. 3*b* is a perspective view of the overhead shower arm in FIG. 3*a* loaded with a handheld shower head.
Figure 4A:
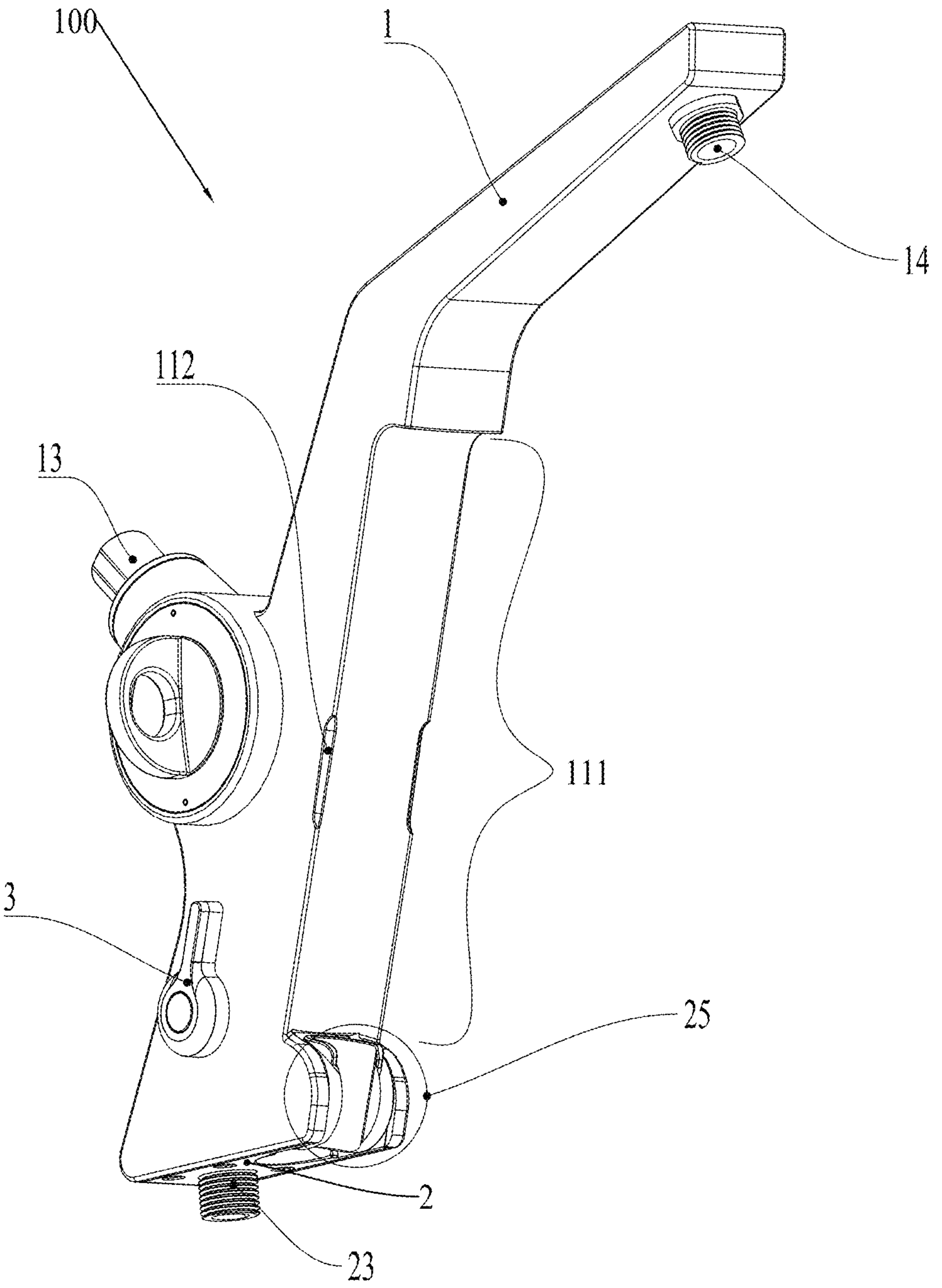
FIG. 4*a* is a perspective view of the overhead shower arm of the present application with a filter cartridge and a sunken portion.
Figure 4B:
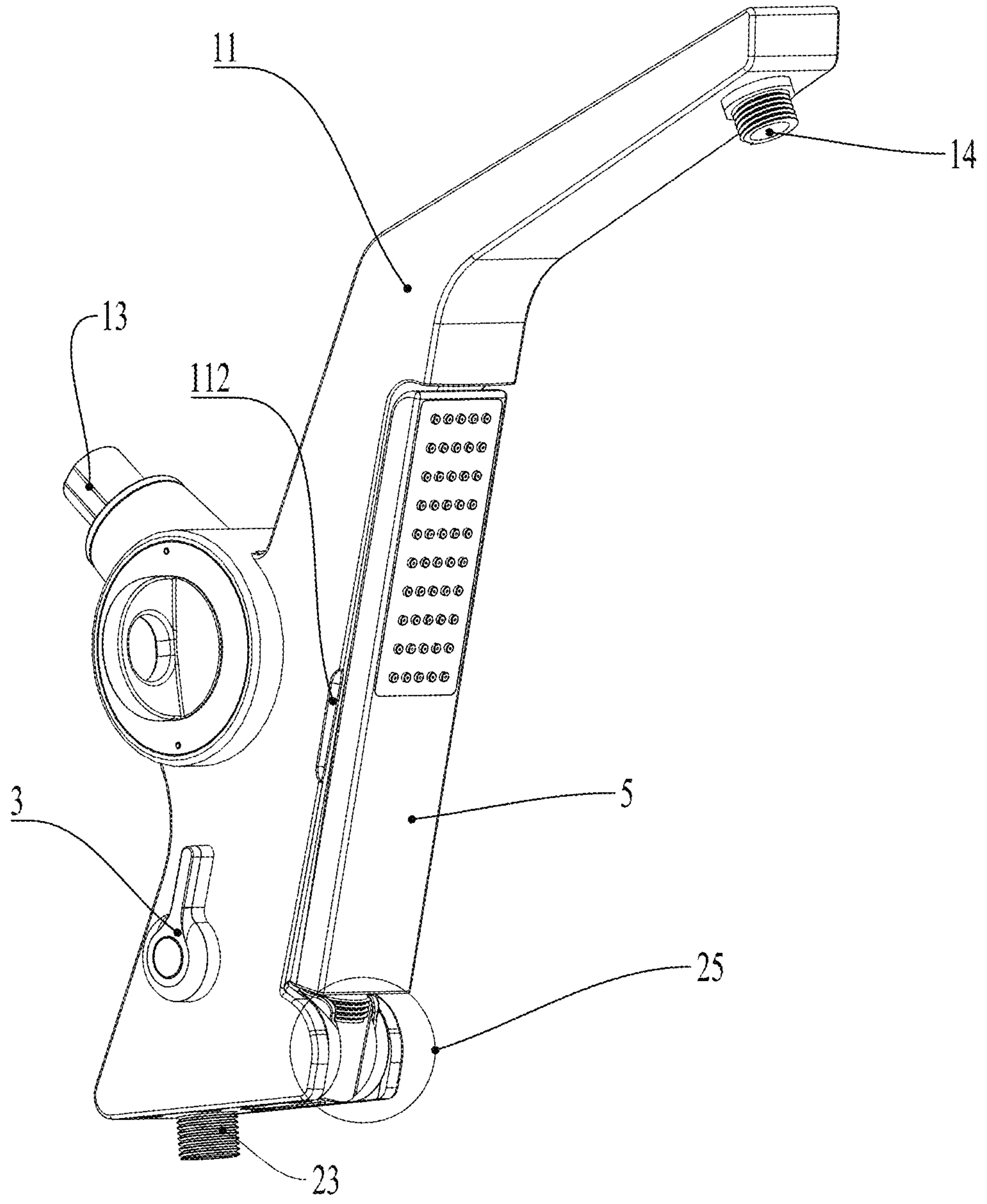
FIG. 4*b* is a perspective view of the overhead shower arm in FIG. 4*a* loaded with the handheld shower head.
Figure 4C:
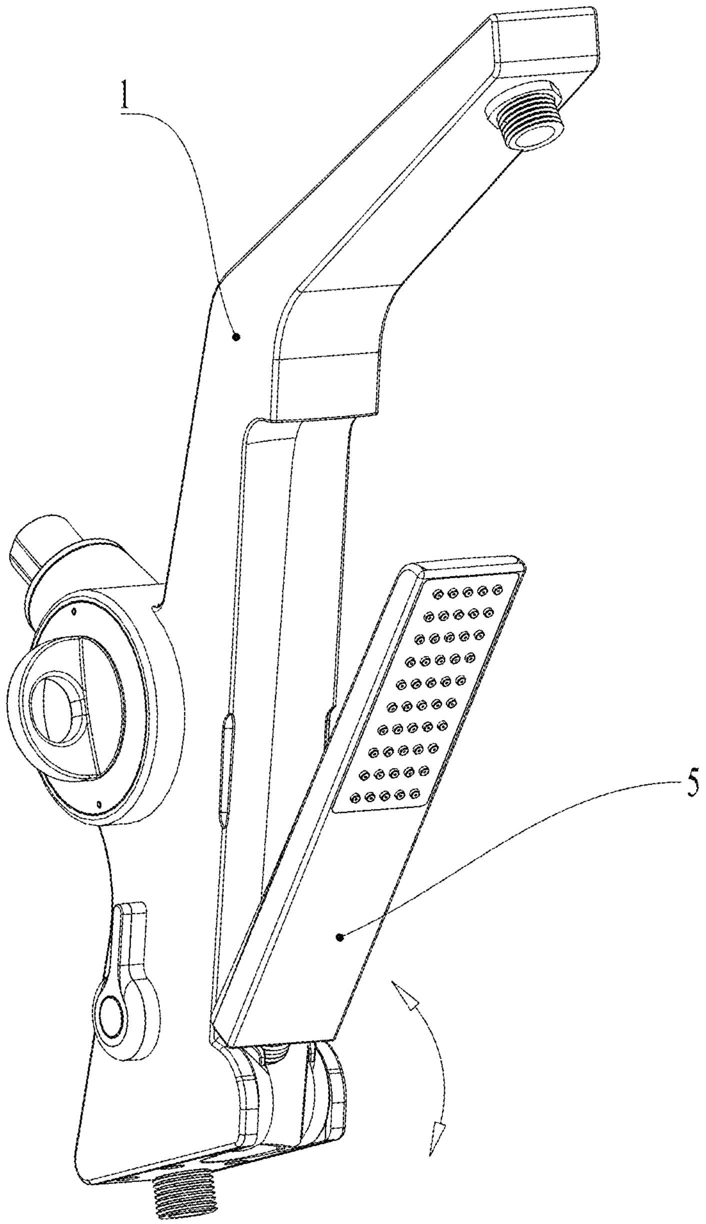
FIG. 4*c* is a demonstration view of the overhead shower arm in FIG. 4*a* loaded with the handheld shower head in a taken-out state.
Figure 4D:
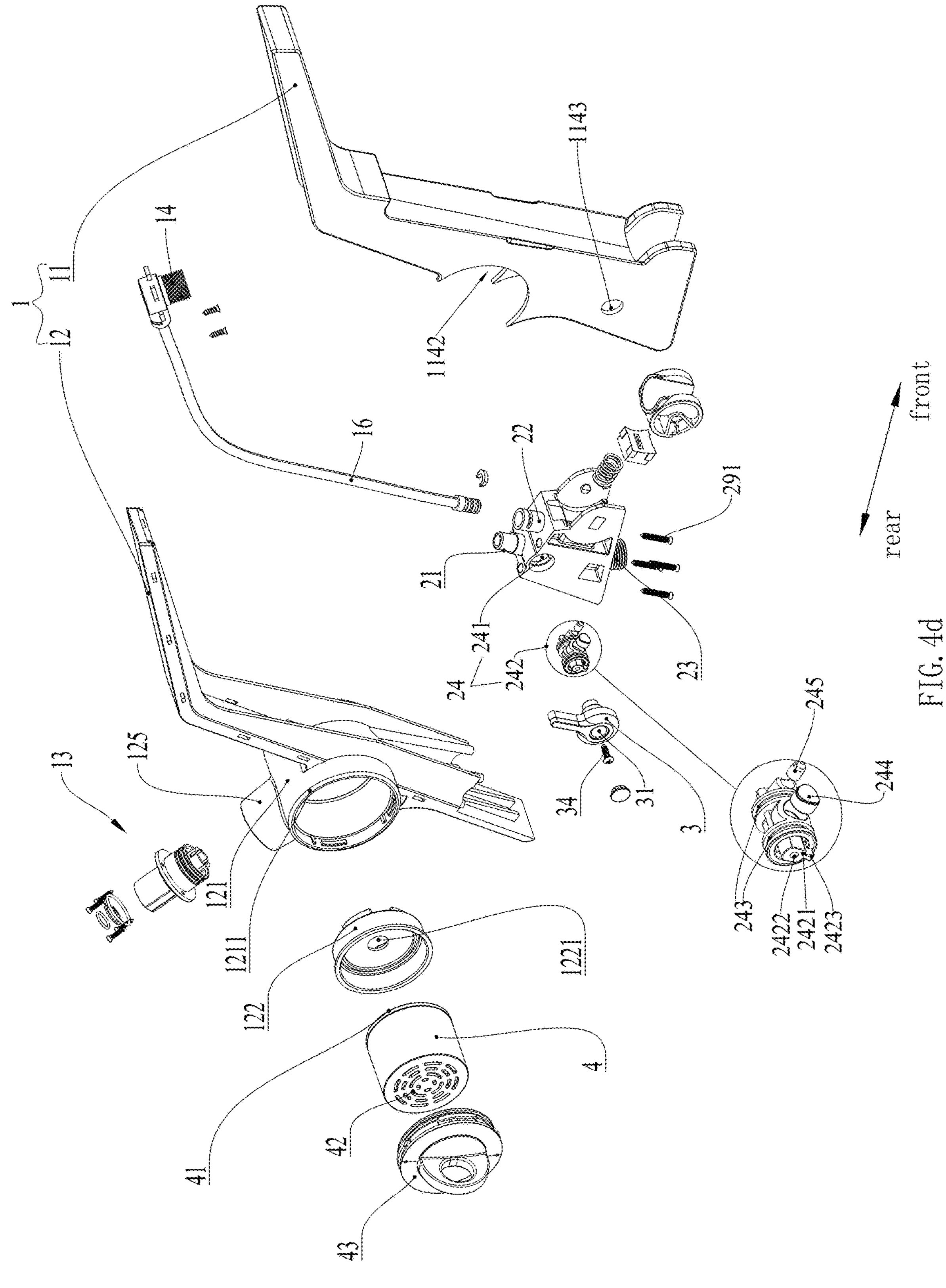
FIGS. 4*d* to 4*f* are exploded perspective views of the overhead shower arm in FIG. 4*a* from different angles.
Figure 4E:
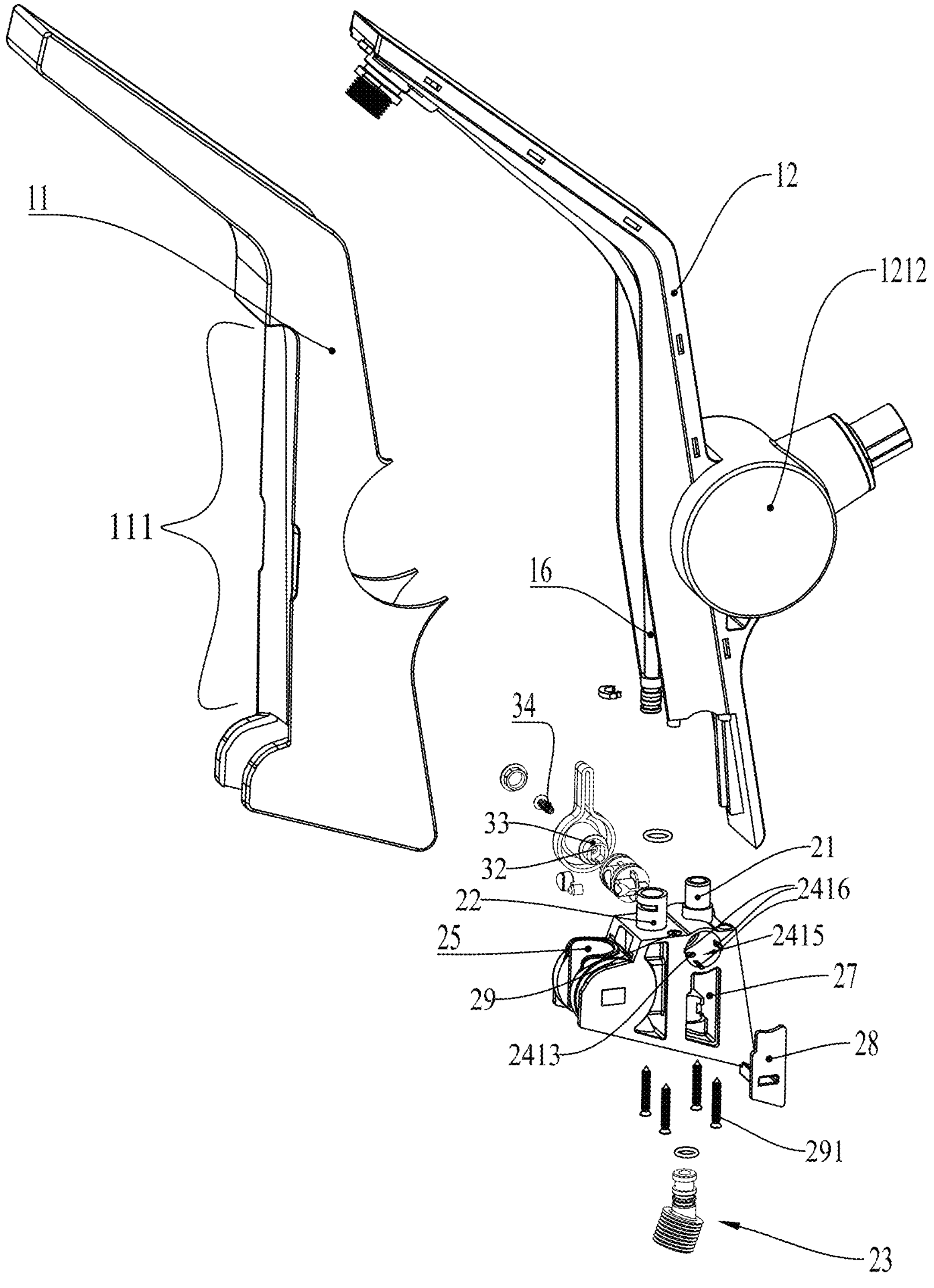

As shown in FIG. 4*a*, this application discloses an overhead shower arm 100 with a shower head holder. The overhead shower arm 100 includes an arm 1, a seat body 2, and an actuator 3. A top free end of the arm 100 protrudes forward, facilitating the installation of a first water outlet joint 14 at the top free end of the arm 1. The arm 1 can be shaped like the curved arm as disclosed in the conventional technology (U.S. patent Ser. No. 12/269,049B1), but in this embodiment, an angular design is adopted for the arm 1. A middle-lower part of the arm 1 has a forward-leaning vertical segment 116, and a middle-upper part of the arm 1 forms a forwardly bent segment 117, such that an angle α is formed between the vertical segment 116 and the bent segment 117 of the arm 1. The angle α ranges from 90° to 150°, i.e., 90°≤α≤150° (see FIG. 6*a*). An installation cavity with an opening that opens downward and forward is formed at the bottom of the arm 1, and the seat body 2 is fixedly arranged in the installation cavity. A second water outlet joint 23 is provided at the bottom of the seat body 2, and a shower head holder 25 is provided at the front of the seat body 2. A magnetic attraction structure similar to that disclosed in the conventional technology (U.S. Pat. No. 12,269,049B1) may be adopted for the shower head holder, that is, the shower head holder and the matching hand-held shower head are provided with a magnetic material and a magnetic attraction material, respectively, or by providing positive and negative magnetic materials on the two, respectively, the hand-held shower head and the shower head holder are connected by the magnetic attraction principle (not shown). The structure of the shower head socket (also known as the shower head wall mount) disclosed in the shower head holder 25 according to this embodiment may also be adopted. For its specific structure, reference may be made to the patent document CN215858027U, which discloses that the shower head socket may be adjusted in angle. If the shower head holder 25 adopts a magnetic attraction structure or the shower head socket can be adjusted in angle, at the front end surface of the vertical segment 116 of the arm 1 and above the shower head holder 25, a recessed portion 111 is formed. The depth of the recessed portion 111 is configured to correspond to the thickness of the handheld shower head 5. Therefore, when the handheld shower head 5 is placed in the recessed portion 111, a front-end surface of the handheld shower head 5 is substantially flush with a front-end surface of a portion, other than the recessed portion 111, of the vertical segment 116 of the arm 1, making the entire overhead shower arm 100 assembly constructed by loading the handheld shower head 5 more simple in shape and having better visual aesthetics. Taking the shower head holder 25 with an angle-adjustable shower head socket structure as an example, as shown in FIG. 4*c*, when it is necessary to remove the handheld shower head 5 from the shower head holder 25, the handheld shower head 5 inserted in the shower head holder 25 must first be rotated forward such that its top is offset from the top of the recessed portion 111 of the arm 1, and then the handheld shower head 5 is pulled out of the shower head holder 25. To facilitate the removal of the handheld shower head 5 from the recessed portion 111 of the arm 1, on each side of the recessed portion 111 of the arm 1, a notch 112 may be provided. The arm 1 with the recessed portion 111 disclosed herein is simply the preferred design; an overhead shower arm 100*a* without the recessed portion 111, as shown in FIGS. 3*a* and 3*b*, may also be used. Therefore, if the shower head holder 25 is embodied as a socket structure, the shower head holder 25 may be either a fixed socket or an angle-adjustable socket. It should be noted that the handheld shower head 5 disclosed in this embodiment is a flat design, cylindrical handheld shower heads are also commonly found on the market, therefore, the recessed portion of the overhead shower arm may be designed with a concave arc transition (not shown) to achieve more unified and harmonious designs of the hand-held shower head and the overhead shower arm.

As shown in FIGS. 4*d* to 4*i*, the arm 1 is composed of a front shell 11 and a rear shell 12. The front shell 11 is defined by a front panel 113, two first side panels 114, and an upper panel 115 to form a hollow component with an open back, and multiple retaining blocks 1141 are provided on the inner walls of the two first side panels 114. The rear shell 12 includes a rear panel 128 and two second side panels 129, which define a hollow component with an open front; the lower parts of the two second side panels 129 form a free segment, and the second side panels 129 are provided with retaining holes 1291 at positions corresponding to the retaining blocks 1141. The two second side panels 129 are covered by the two first side panels 114 such that the retaining blocks 1141 and the retaining holes 1291 are mutually snap-connected, thereby, the front shell 11 and the rear shell 12 are spliced and fixed together front and back to form an arm 1 with a hollow inner cavity. The bottom of the arm 1 forms an installation cavity with an opening that opens downward and forward. A cylindrical body 121 is horizontally arranged at the rear part of the rear shell 12, the cylindrical body 121 has a hollow inner cavity, and a filter element 4 is placed in the inner cavity. The two first side panels 114 of the front shell 11 form an arc-shaped clearance gap 1142 at a position corresponding to the cylindrical body 121. Of course, if the cylindrical body 121 is set at the rear of the rear panel 128 of the rear shell 12, the arc-shaped clearance gap 1142 of the front shell 11 may not be provided. To realize the replacement of the filter element 4, one end of the cylindrical body 121 is an open end 1211, and the other end is a closed end 1212. A water baffle 122 is provided in the cylindrical body 121 on a side close to the closed end 1212, such that a first water holding chamber I is formed between the water baffle 122 and the closed end 1212 of the cylindrical body 121. A first water flow hole 1221 is provided in the middle of the water baffle 122. The filter element 4 is disposed in the cylindrical body 121 through the open end 1211. One end of the filter element 4, facing the water baffle 122, is the water inlet end 41, and the other end is the water outlet end 42. A screw cap 43 seals the open end 1211 of the cylindrical body 121, such that the space of the cylindrical body 121 for placing the filter element 4 is defined as a second water holding chamber II. A second water flow hole 123 is provided in a tubular wall of the second water holding chamber II. A water receiving channel 124 is further provided in the inner cavity of the rear shell 12, and one end of the water receiving channel 124 is connected to the second water flow hole 123. To prevent water from leaking from the gap between the outer wall of the filter element 4 and the water baffle 122, an end-face sealing ring 1222 is additionally provided between the water baffle 122 and the water inlet end 41 of the filter element 4 in this embodiment. To facilitate removal of the filter element 4 from the cylindrical body 121, the screw cap 43 forms an interference fit with the outer wall of the filter element 4, and in addition, several stop bars 431 are provided on an inner end surface of the screw cap 43 to ensure sufficient water flow between the water outlet end 42 of the filter element 4 and the screw cap 43. Rotating the screw cap 43 and removing it from the open end 1211 of the cylindrical body 121 allows the filter element 4 to be removed with it. A mounting boss 125 is provided to protrude outward from the outer wall of the cylindrical body 121 and on a side facing away from the front shell 11. The mounting boss 125 is provided with a third water passage 1251 on a side thereof, and the third water passage 1251 is in fluid communication with the first water holding chamber I. A water inlet joint 13 is secured to this mounting boss 125.

Figure 4F:
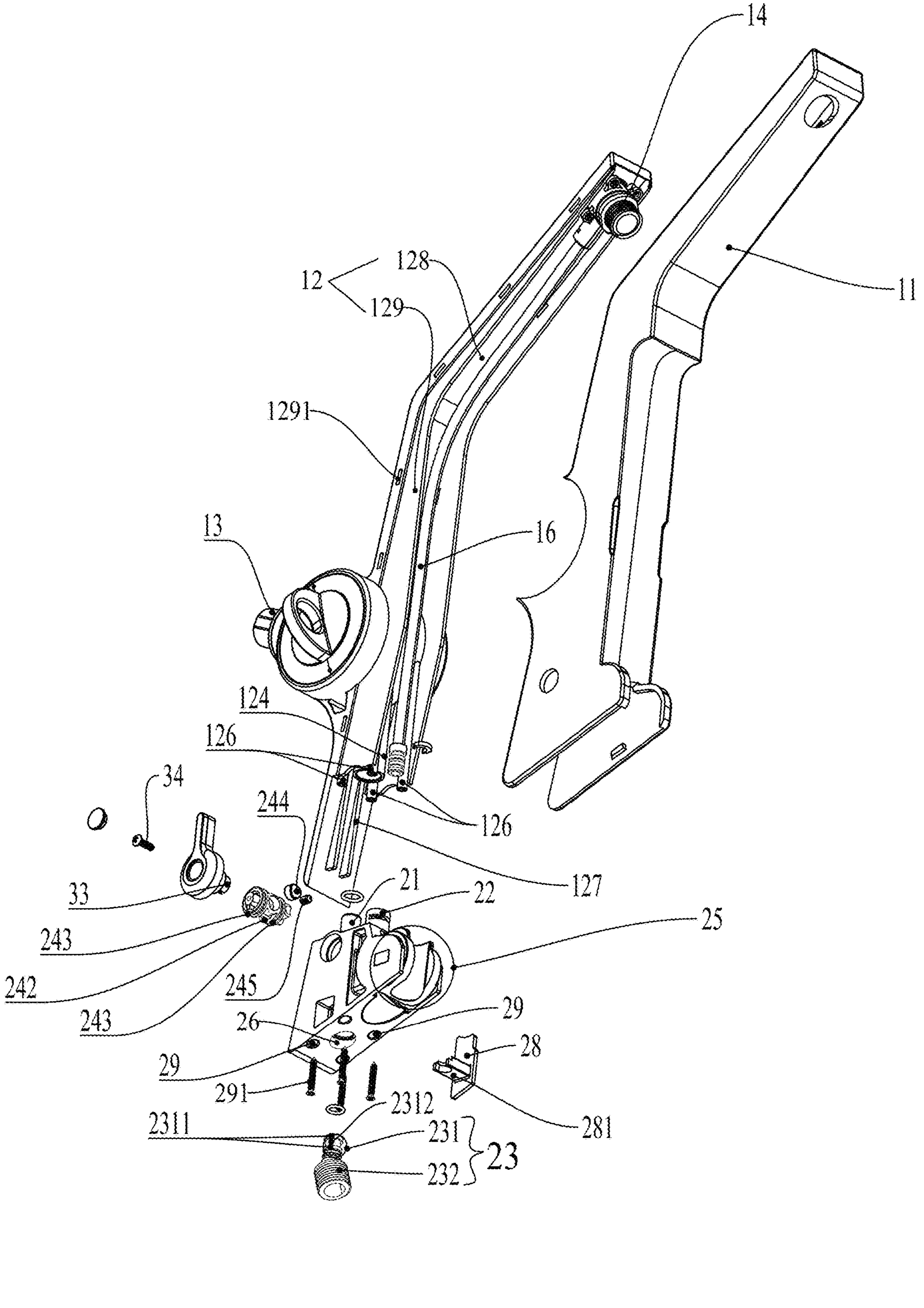
Figure 4G:
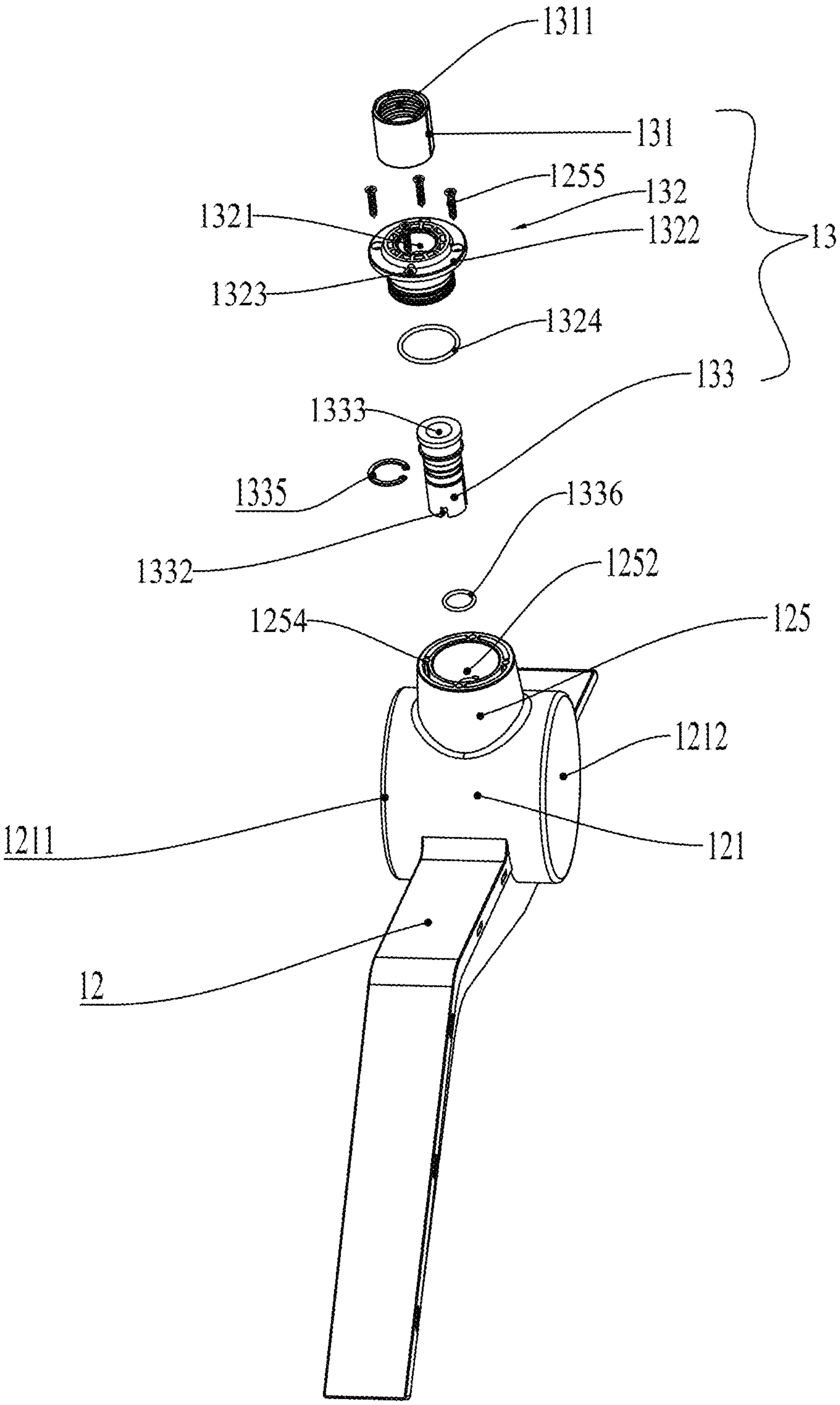
FIG. 4*g* is an exploded perspective view of a rear shell in FIG. 4*a* with a water inlet joint.

As shown in FIG. 4*g*, the water inlet joint 13 includes a connector 131, a fixing seat 132, and a water flow positioning pin 133. The mounting boss 125 has a first countersunk hole 1252 in its central portion, a first fastening hole 1253 is provided in the center of the first countersunk hole 1252, and the third water passage 1251 is arranged on the side of the first countersunk hole 1252 adjacent to the first water holding chamber I. The upper portion of the fixing seat 132 is further provided with a flange 1322, and the flange 1322 is provided with multiple second through holes 1323. A top portion of the mounting boss 125 is provided with second fastening holes 1254 at positions corresponding to the second through holes 1323. Multiple second set screws 1255 pass through the corresponding second through holes 1323 and are screwed into the second fastening holes 1254, respectively, and in this way, the fixing seat 132 is fixedly connected to the mounting boss 125. A first through hole 1321 that penetrates axially is formed at a central axial portion of the fixing seat 132, and the first through hole 1321 is configured to allow the water flow positioning pin 133 to pass through. The connector 131 passes through axially, its upper part is provided with an internal thread segment 1311, and its lower part is provided with a bottom edge 1312 extending inwardly. The bottom edge 1312 of the connector 131 is placed on the top of the fixing seat 132, and the connector 131 is designed to be coaxial with the first through hole 1321. The upper-middle part of the outer wall of the water flow positioning pin 133 is provided with a first retaining edge 1331 protruding outward, and the middle-lower part of the outer wall of the water flow positioning pin 133 is provided with multiple water flow grooves 1332, and the central axial portion of the water flow positioning pin 133 is provided with a fourth water passage 1333 that is in communication with an external water source. The fourth water passage 1333 is in fluid communication with the third water passage 1251 through the water flow grooves 1332. A support platform 1334 is provided at the bottom of the water flow positioning pin 133. The water flow positioning pin 133 is sequentially inserted into the connector 131 and the first through hole 1321 of the fixing seat 132 until the support platform 1334 is against the bottom of the first countersunk hole 1252. A first fastening screw 134 passes through the support platform 1334 and is screwed into the first fastening hole 1253 to fix the water flow positioning pin 133. The first retaining edge 1331 of the water flow positioning pin 133 is pressed against the bottom edge 1312 of the connector 131 from top to bottom, thereby fixing the connector 131 to the top of the fixing seat 132. To prevent water from leaking from the gap between the water flow positioning pin 133 and the fixing seat 132, and the gap between the fixing seat 132 and the mounting boss 125, a second O-shaped sealing ring 1336 is placed on the water flow positioning pin 133, and a third O-shaped sealing ring 1324 is placed on the fixing seat 132. This design ensures that the heavy overhead shower arm 100 assembly (with the overhead shower head and handheld shower head 5 installed) is securely fixed to the water outlet tube. A more preferred design is to further provide a retaining ring 1335 on an outer wall of the water flow positioning pin 133 and, when in an assembled state, below the first through hole 1321, which can prevent the first set screw 134 from accidentally disengaging from the first fastening hole 1253, potentially causing the water flow positioning pin 133 to be pulled out of the fixing seat 132 and causing the arm 1 to fall off the connector 131.

Figure 4H:
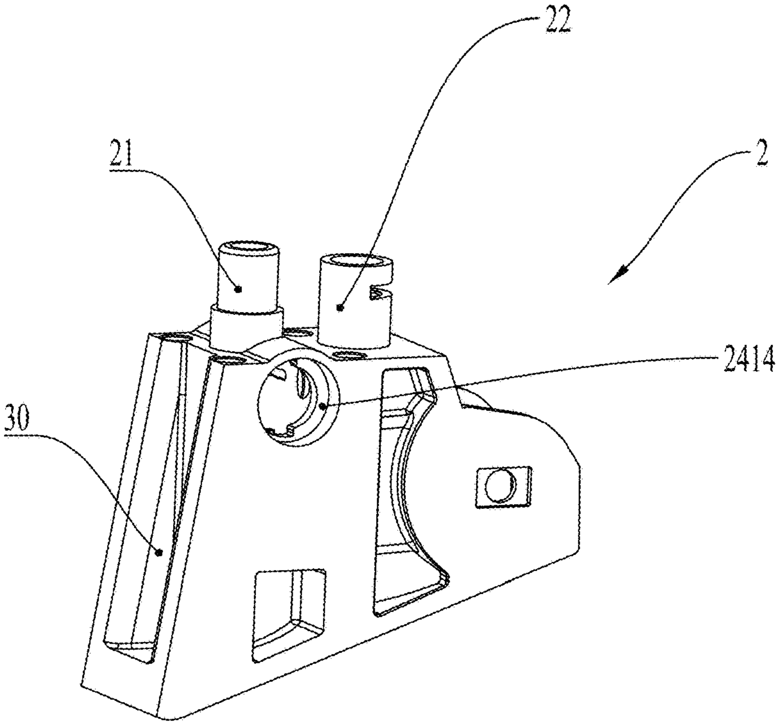
FIG. 4*h* is a side perspective view of a seat body.
Figure 4I:
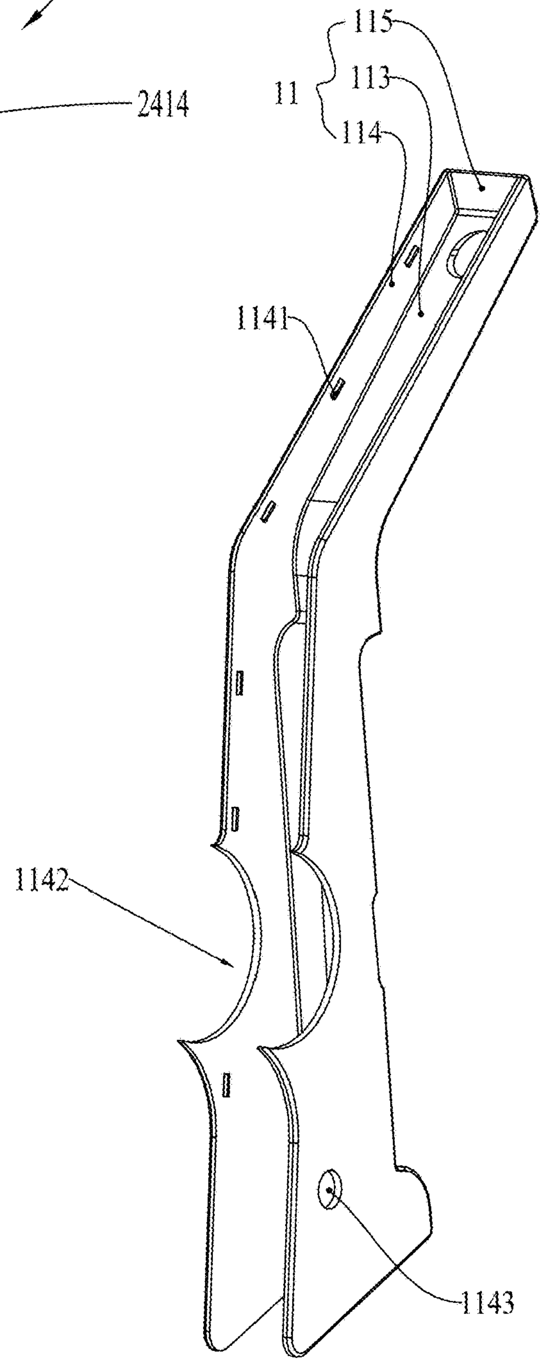
FIG. 4*i* is a side rear view of a front shell.
Figure 5A:
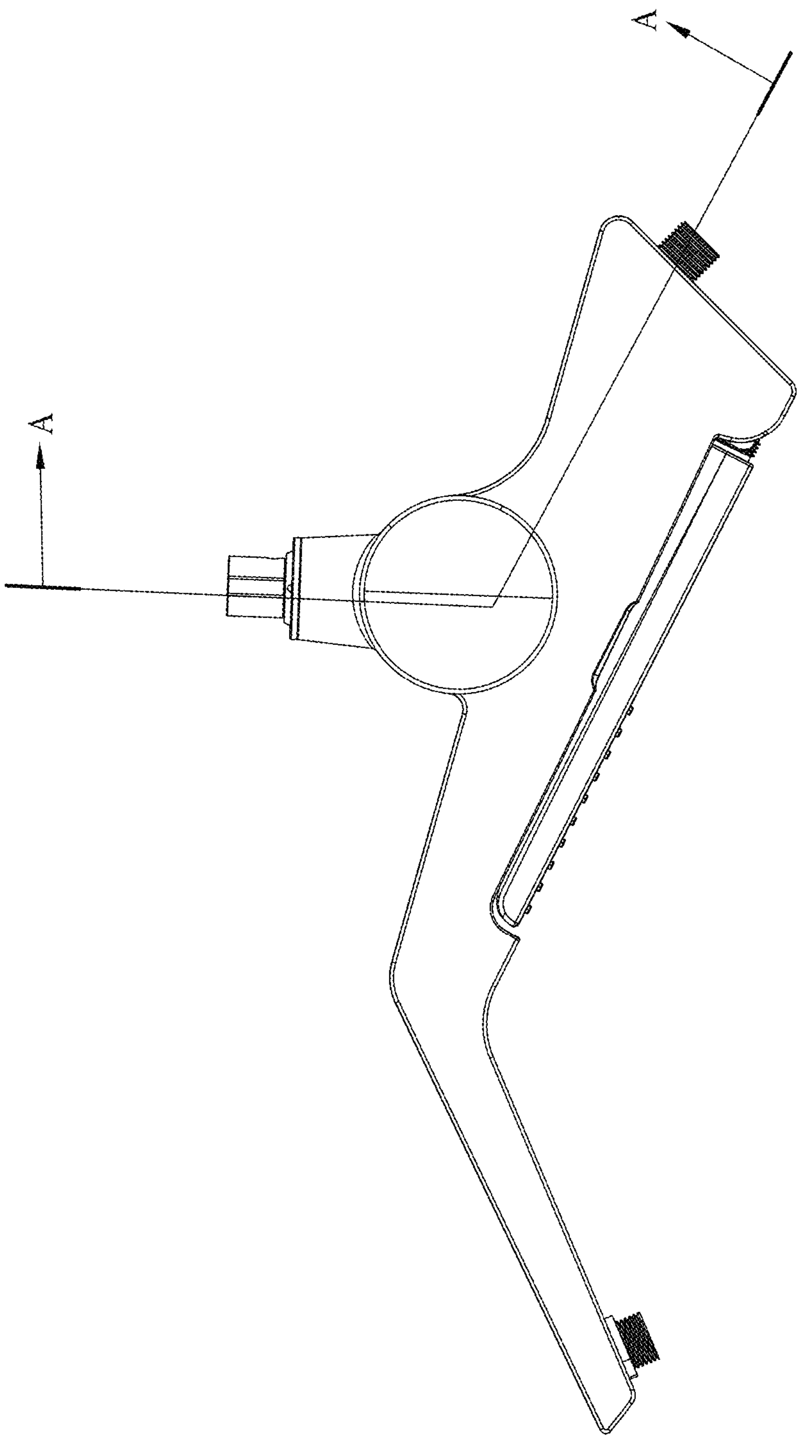
FIG. 5*a* is a side view of the overhead shower arm in FIG. 4*a* loaded with the handheld shower head.
Figure 5B:
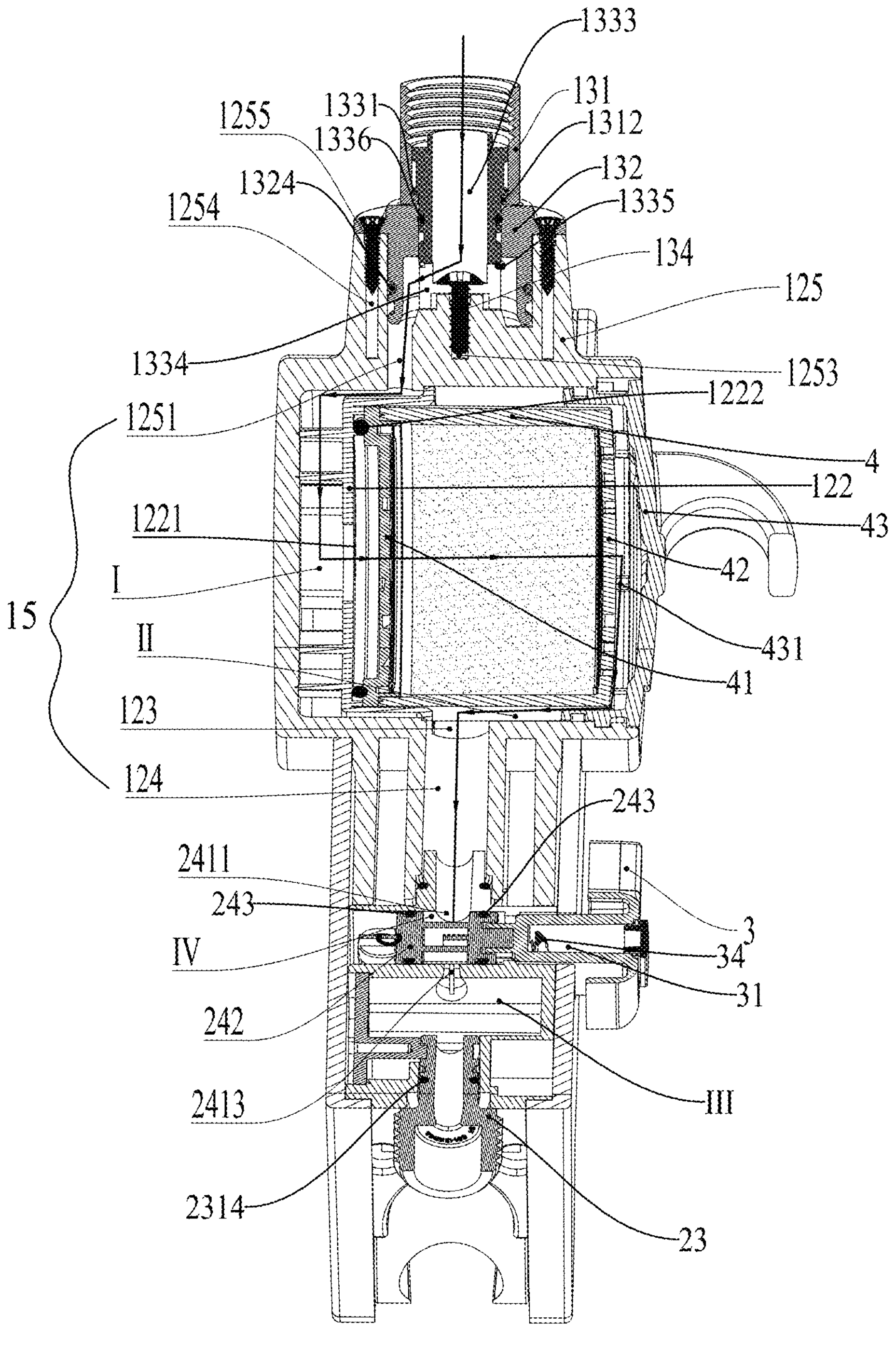
FIG. 5*b* is a cross-segmental view of the overhead shower arm in FIG. 5*a* taken along line A-A.

As shown in FIG. 4*h*, the top of the seat body 2 is equipped with a first water flow coupling 21 and a second water flow coupling 22, and the bottom of the seat body 2 is provided with a second water outlet joint 23. The first water flow coupling 21 is in fluid communication with a first water passage 15. The third water passage 1251, the first water holding chamber I, the first water flow hole 1221 of the water baffle 122, the second water holding chamber II, the second water flow hole 123, and the water receiving channel 124 together constitute the first water passage 15. The second water flow coupling 22 is in fluid communication with the second water passage 16. The second water passage 16 disclosed in this embodiment is a separately provided hose. Of course, the second water passage 16 may also be directly injection molded into the inner cavity of the rear shell 12 or front shell 11, but this may increase manufacturing costs. The seat body 2 is provided with a water path switching spool 24 between the first water flow coupling 21, the second water flow coupling 22, and the second water outlet joint 23. The water path switching spool 24 includes an installation channel 241 and a valve stem 242. The installation channel 241 is arranged transversely at a lower side of the seat body 2 below the first water flow coupling 21 or the second water flow coupling 22. Its cross-section is circular. The installation channel 241 runs through the seat body 2 transversely. One end of the installation channel 241 is provided with an arc-shaped limit block 2414, and the other end serves as an insertion end 2415 of the valve stem 242. The valve stem 242 is provided with a connecting block 2421 protruding outward at the end facing a knob 3. The connecting block 2421 is non-circular in shape and is provided with a third fastening hole 2422 in the central portion. The connecting block 2421 is provided with a stop block 2423 protruding in a radial direction of the valve stem 242. Two sealing rings (first O-shaped sealing ring 243) are sleeved on a middle segment of the valve stem 242 to be spaced apart, and a plug 244 is provided between the first O-shaped sealing rings 243. The valve stem 242 is inserted from the insertion end 2415 of the installation channel 241 until it is restricted by the arc-shaped limit block 2414, such that the space between the two first O-shaped sealing rings 243 of the installation channel 241 forms a water collection chamber IV. Moreover, the inner wall of the installation channel 241 is provided with a first water outlet 2411, a second water outlet 2412, and a third water outlet 2413 circumferentially at the water collection chamber IV. The first water outlet 2411 is in fluid communication with the first water flow coupling 21, the second water outlet 2412 is in fluid communication with the second water flow coupling 22, and the third water outlet 2413 is in fluid communication with the second water outlet joint 23. A more preferred design is that the installation channel 241 is provided transversely with three positioning notches 2416 on its inner wall at the insertion end 2415. These three positioning notches 2416 correspond to the second water outlet 2412, the third water outlet 2413, and the inner wall on a side away from the second water outlet 2412, respectively; a spring-loaded positioning terminal 245 is provided at a corresponding position on the radial end of the valve stem 242. Rotating the knob 3 drives the valve stem 242 to rotate, causing the positioning terminal 245 to switch between different positioning notches 2416, and emit a positioning sound in the process of switching to indicate to the user that the knob 3 has been switched into position.

As shown in FIG. 4*f*, the rear shell 12 is provided with four downwardly extending screw posts 126 protruding from a portion of the rear shell below the outer wall of the cylindrical body 121, and four positioning through holes 29 are provided at the bottom of the seat body 2 at positions corresponding to the screw posts 126. Four fourth set screws 291 pass through the positioning through holes 29 in sequence and are locked to the screw posts 126 to fix the seat body 2 to the rear shell 12. In a preferred design, the inner wall of the rear panel 128 of the rear shell 12 is provided with two guide positioning plates 127 protruding forward in the vertical direction in a region corresponding to the installation cavity, and the rear portion of the seat body 2 is recessed inward from top to bottom to form a limit groove 30. The limit groove 30 can be designed as a single, downwardly concave groove (as shown in FIG. 4*h*) or as two vertical limit rails (not shown) that mate with the guide positioning plates 127. The seat body 2 is vertically guided and positioned by the two guide positioning plates 127 through the limit groove 30, thereby ensuring that the four positioning through holes 29 of the seat body 2 precisely mate with the four screw posts 126. Furthermore, since the two second side panels 129 of the rear shell 12 have recessed segments, the provision of the guide positioning plates 127 in the recessed regions may further enhance the structural strength of the rear panel 128.

Figure 6A:
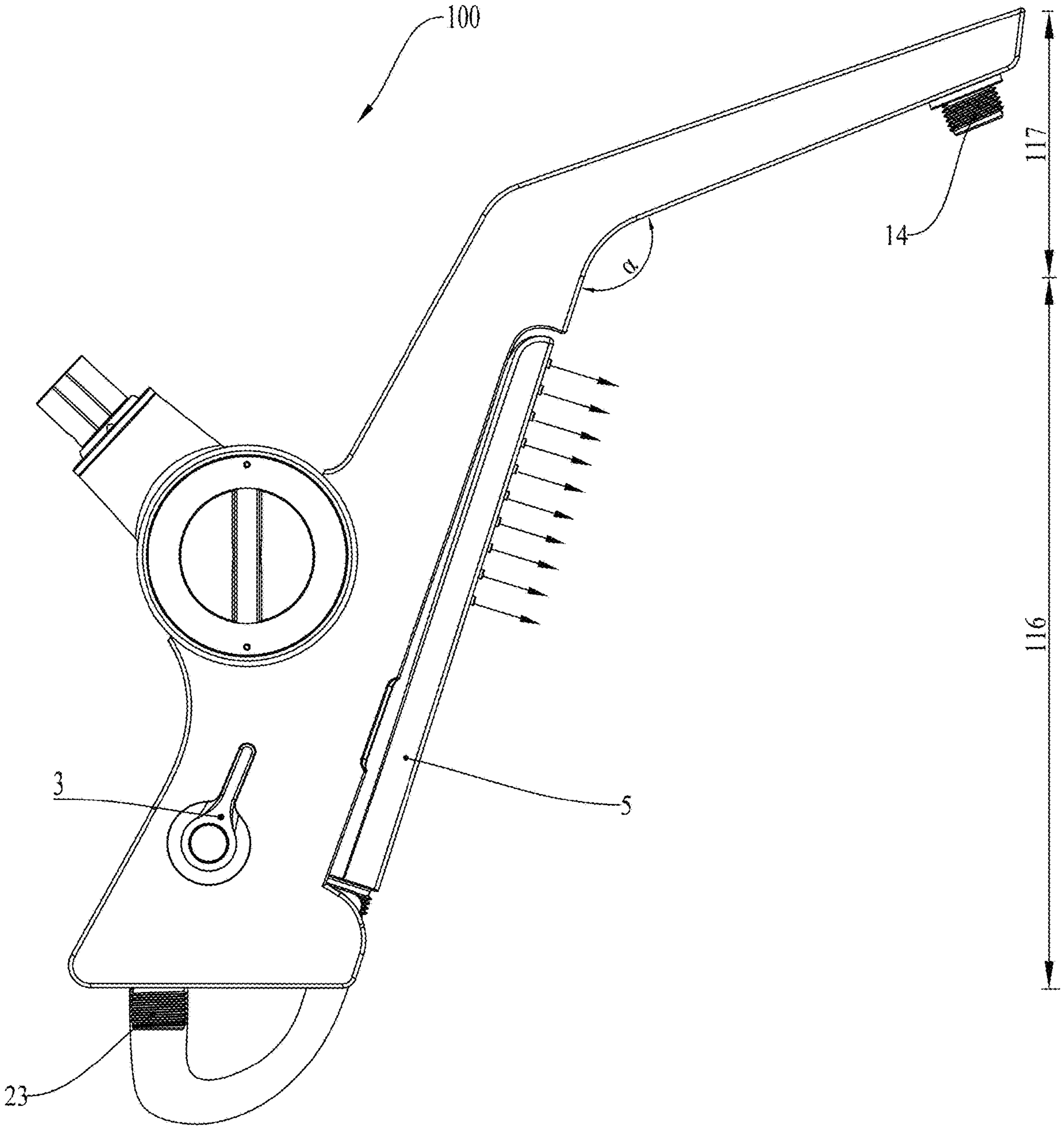
FIGS. 6*a* and 6*b* are schematic diagrams of the water path with an actuator of the overhead shower arm in a first position.
Figure 6B:
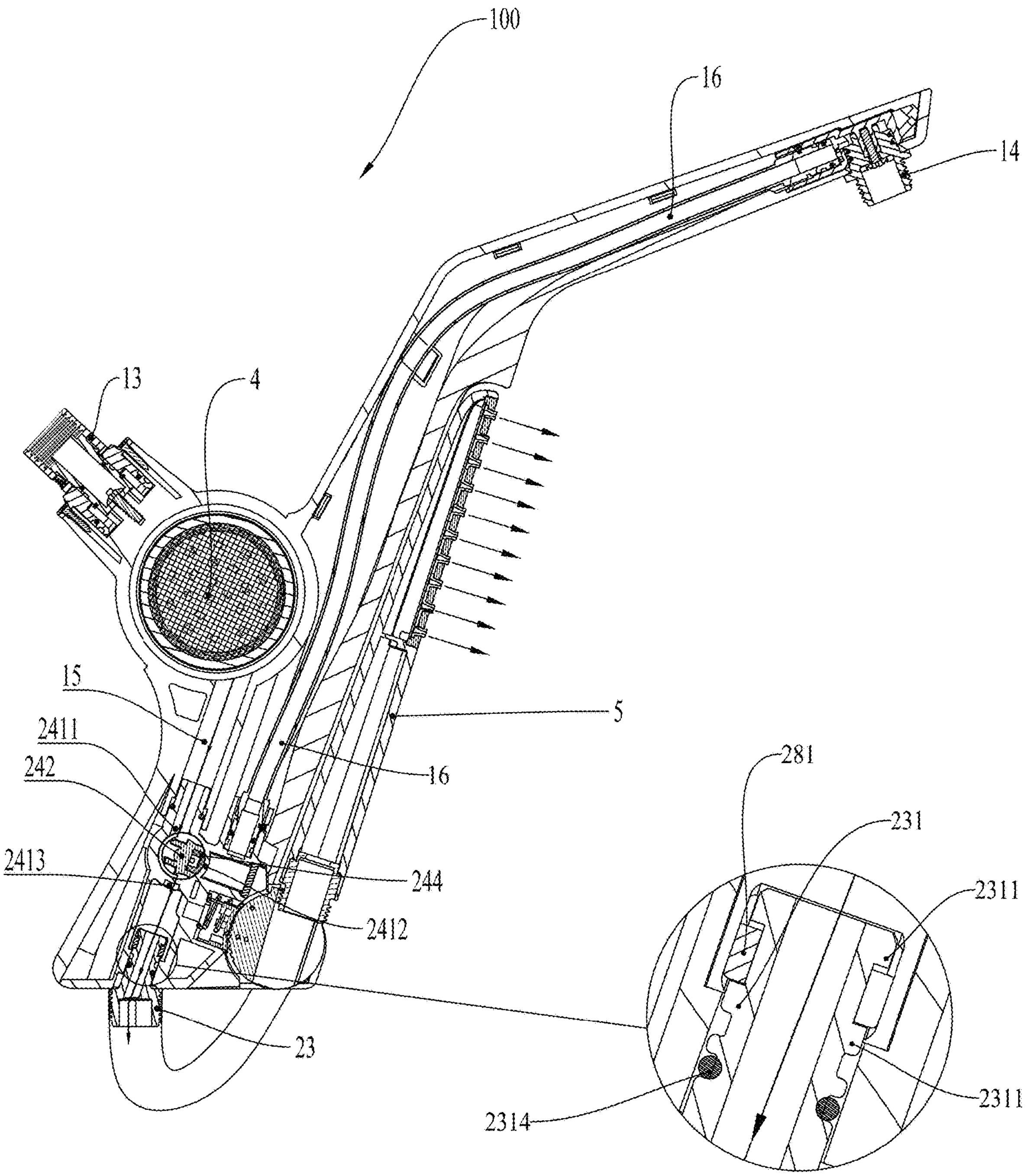

As shown in FIGS. 4*f* and 6*b*, the second water outlet joint 23 and the seat body 2 are designed to be separated. The second water outlet joint 23 is composed of a connecting column 231 and a connecting part 232 from top to bottom. The inner cavities of the connecting column 231 and the connecting part 232 are in communication with each other. An upper segment of the connecting column 231 has two annular protrusions 2311 spaced apart and arranged on its outer peripheral wall, and is defined as a retaining segment 2312. The connecting part 232 is provided with an external thread segment. The bottom of the seat body 2 is provided with a socket 26, and a third water holding chamber III is formed between the socket 26 and the third water outlet 2413. A side of the seat body 2 is provided with a hollowed out portion 27 at a position corresponding to the third water holding chamber III. A water-sealing side cover 28 has a U-shaped insert 281 extending toward the third water holding chamber III. The connecting column 231 is inserted through the socket 26 and extends into the third water holding chamber III. The water-sealing side cover 28 seals the hollowed-out portion 27 by ultrasonic welding. The U-shaped insert 281 abuts against the retaining segment 2312 of the connecting column 231. Up-down position-limiting through the U-shaped insert 281 and the two annular protrusions 2311 retains the second water outlet joint 23 to the bottom of the seat body 2. To prevent water leakage through the gap between the second water outlet joint and the socket 26, a fourth O-shaped sealing ring 2314 is fitted over the connecting column 231. This design facilitates the injection molding of the complex seat body 2 and the reduction of manufacturing costs.

The actuator 3 is a knob 3 with a handle. A second countersunk hole 31 is provided at the central portion of the knob 3. A third through hole 32 is provided in the central portion of the second countersunk hole 31. A sleeve 33 is provided to protrude on the side of the second countersunk hole 31 facing the valve stem 242. The sleeve 33 of the knob 3 passes through a fourth through hole 1143 of one of the first side panels 114 of the front shell 11 and is sleeved on the connecting block 2421 of the valve stem 242. A third set screw 34 passes through the third through hole 32 of the second countersunk hole 31, and is screwed into the third fastening hole 2422, securing the knob 3 to the valve stem 242. Rotating the knob 3 drives the valve stem 242 to rotate synchronously, allowing the plug 244 of the valve stem 242 to selectively block the second water outlet 2412 or the third water outlet 2413, or to rest against the inner wall of the installation channel 241. Moreover, the mutual position limit between the stop block 2423 of the knob 3 and the two ends of the arc-shaped limit block 2414 controls the angular range of the knob 3's rotation.

The operating principle of the overhead shower arm 100 is illustrated as follows in conjunction with FIGS. 5*b* to 8*b:*

Figure 7A:
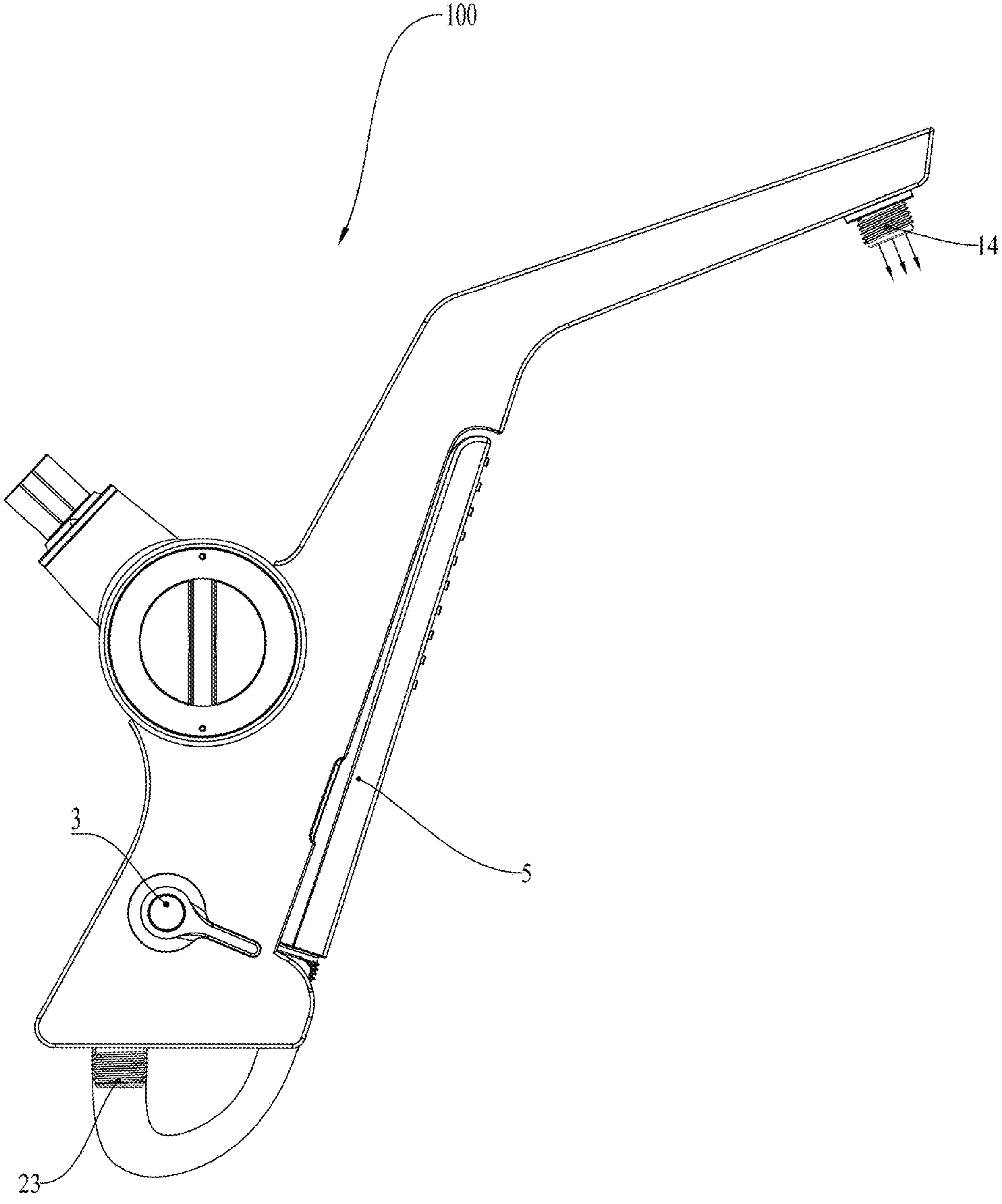
FIGS. 7*a* and 7*b* are schematic diagrams of the water path with the actuator of the overhead shower arm in a second position.
Figure 7B:
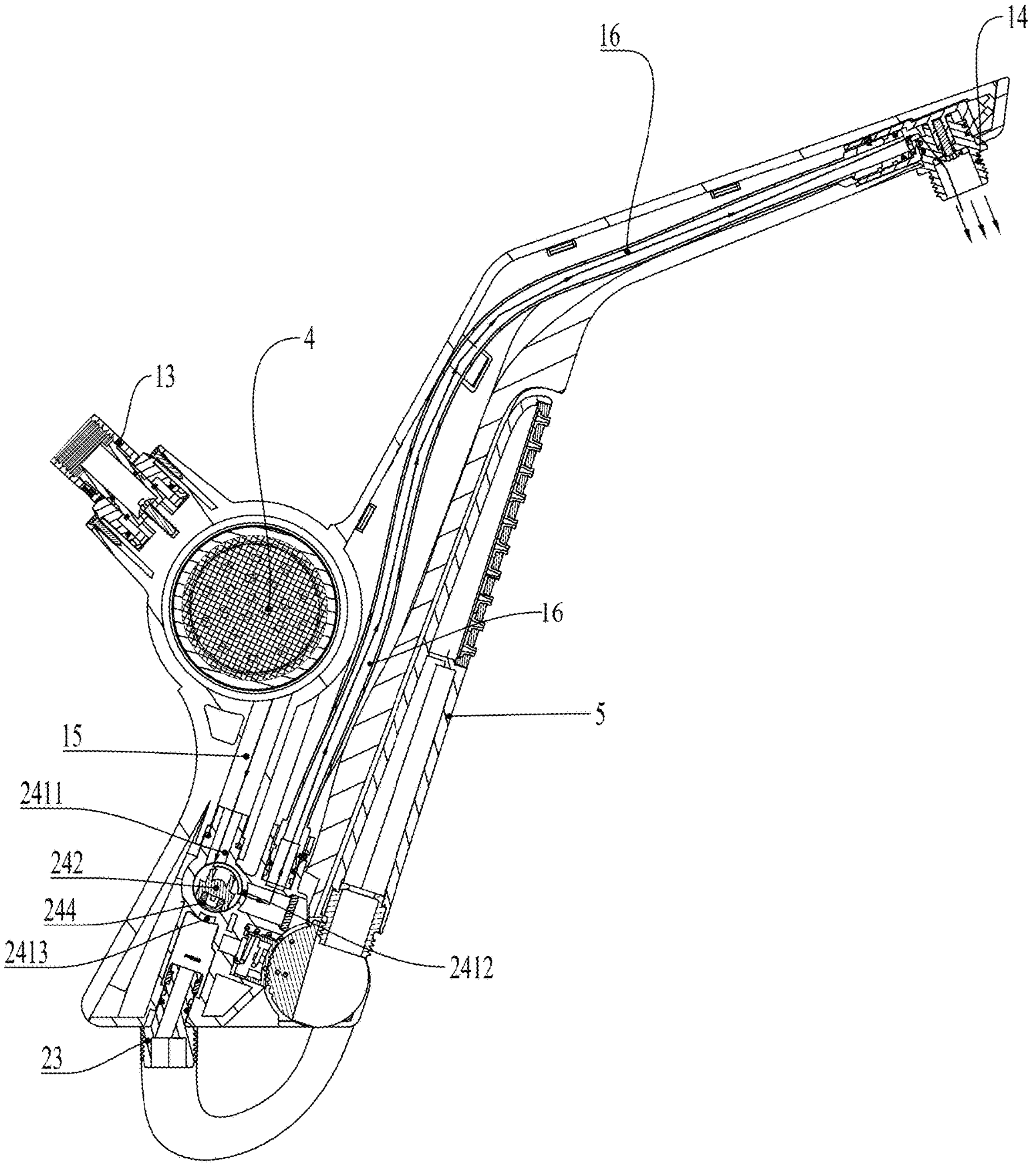
Figure 8A:
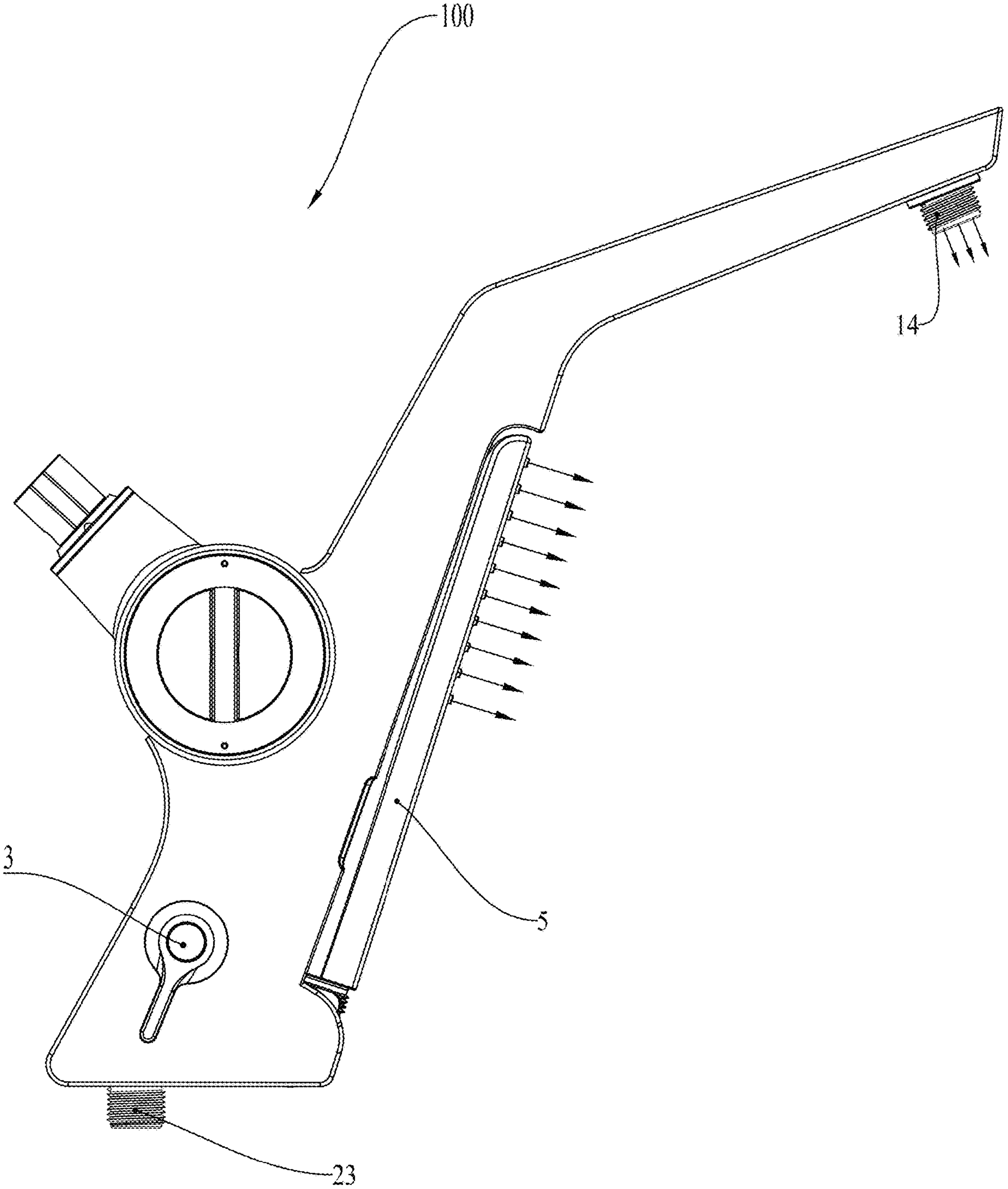
FIGS. 8*a* to 8*b* are schematic diagrams of the waterway with the actuator of the overhead shower arm in a third position.
Figure 8B:
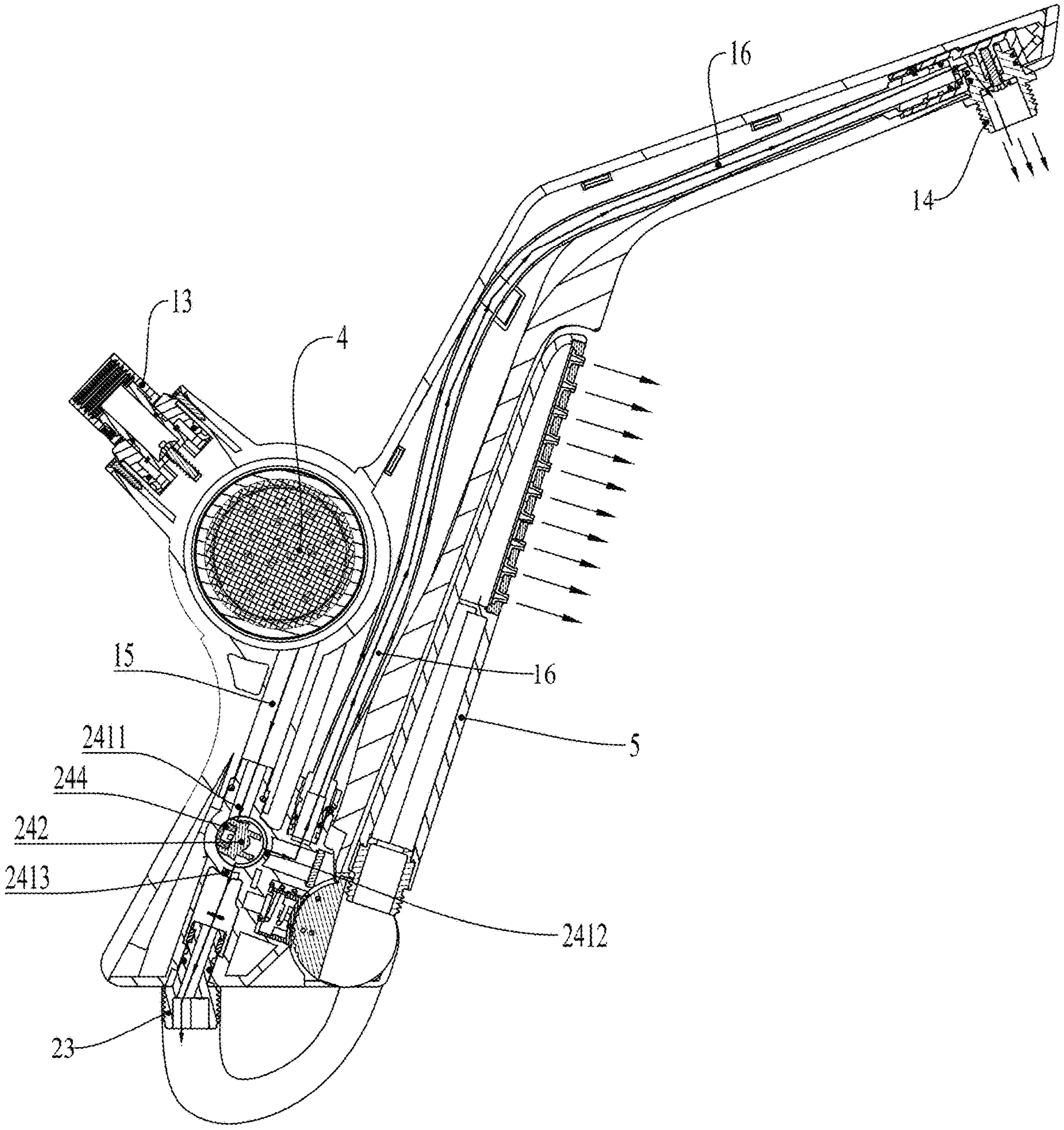

The external water source flows in through the connector 131, passes through the fourth water passage 1333 and the water flow groove 1332 of the water flow positioning pin 133, the third water passage 1251 of the mounting boss 125, and the first water holding chamber I in sequence, and the water flowing into the first water holding chamber I flows into the water inlet end 41 of the filter element 4, and then flows out from the water outlet end 42 of the filter element 4 to the second water holding chamber II, and flows into the water receiving channel 124 through the second water flow hole 123. The external water source may have impurities harmful to the human body effectively filtered out through the filter element 4, such that the water quality is effectively purified. The purified water source flows into the water collection chamber IV of the installation channel 241 through the first water flow coupling 21 of the seat body 2, as shown in FIGS. 6*a* and 6*b*. When the knob 3 points to the first position, the plug 244 of the valve stem 242 blocks the second water outlet 2412, and the water in the water collection chamber IV can only be discharged through the third water outlet 2413. The water flows through the third water holding chamber III to the second water outlet joint 23, and the second water outlet joint 23 is in fluid communication with the handheld shower head 5 via the hose, and the handheld shower head 5 now flows water outward. As shown in FIGS. 7*a* and 7*b*, when the knob 3 is rotated 90 degrees clockwise to point to the second position, the plug 244 of the valve stem 242 blocks the third water outlet 2413. Water in the water collection chamber IV can only be discharged through the second water outlet 2412. The water flow is in fluid communication with the first water outlet joint 14 through the second water passage 16. The overhead shower head (not shown), arranged at the first water outlet joint 14, now flows water outward. As shown in FIGS. 8*a* and 8*b*, when the knob 3 is further rotated by 90 degrees clockwise to point to the third position, the plug 244 of the valve stem 242 abuts against the inner wall of the water collection chamber IV. The first water outlet 2411 is in fluid communication with both the second water outlet 2412 and the third water outlet 2413. Water can now flow outward from the first water outlet joint 14 and the second water outlet joint 23 simultaneously.

Figure 1:
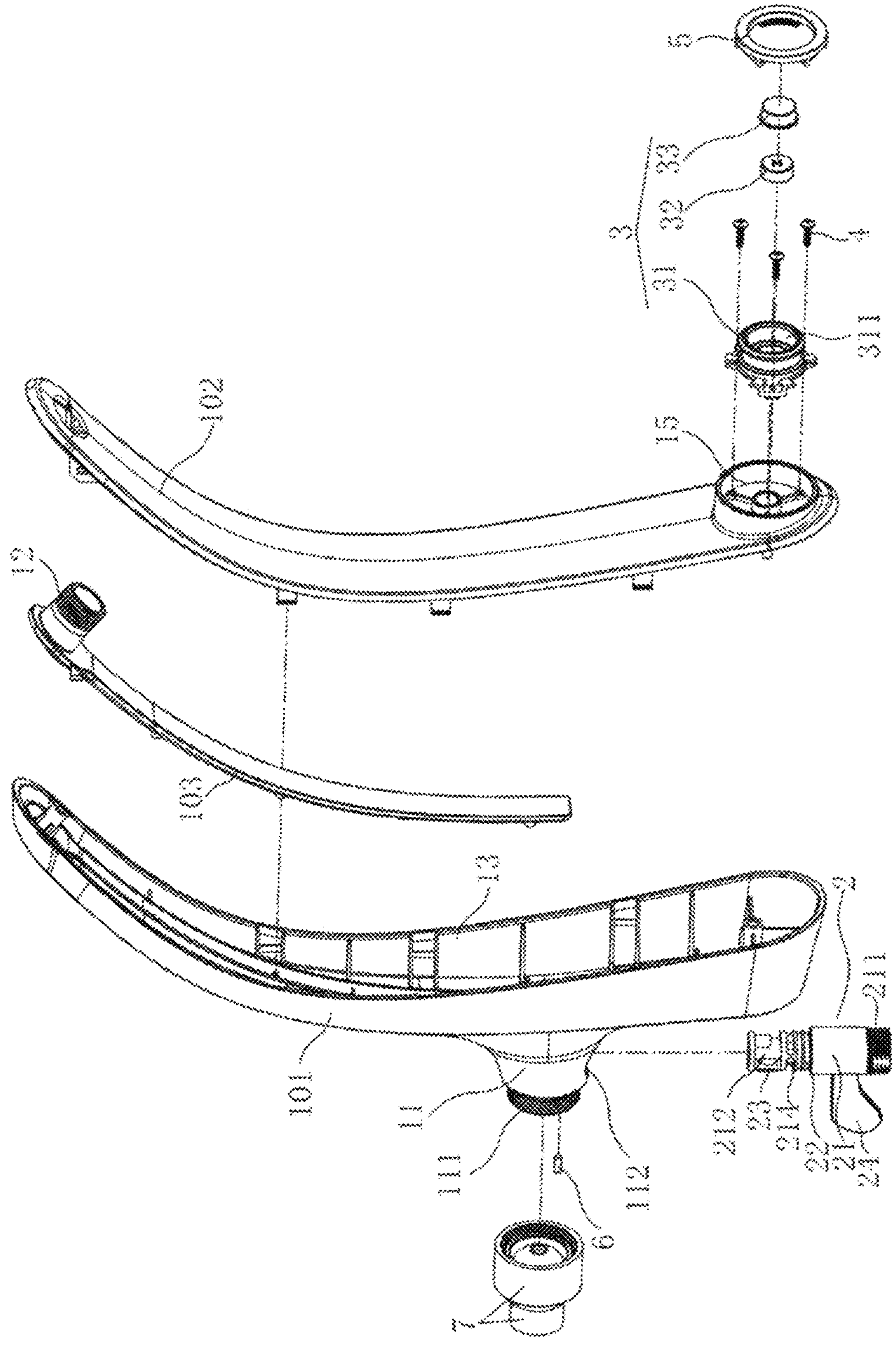
FIG. 1 is an exploded view of the components of a conventional overhead shower arm (U.S. patent Ser. No. 12/269,049B1)
Figure 2:
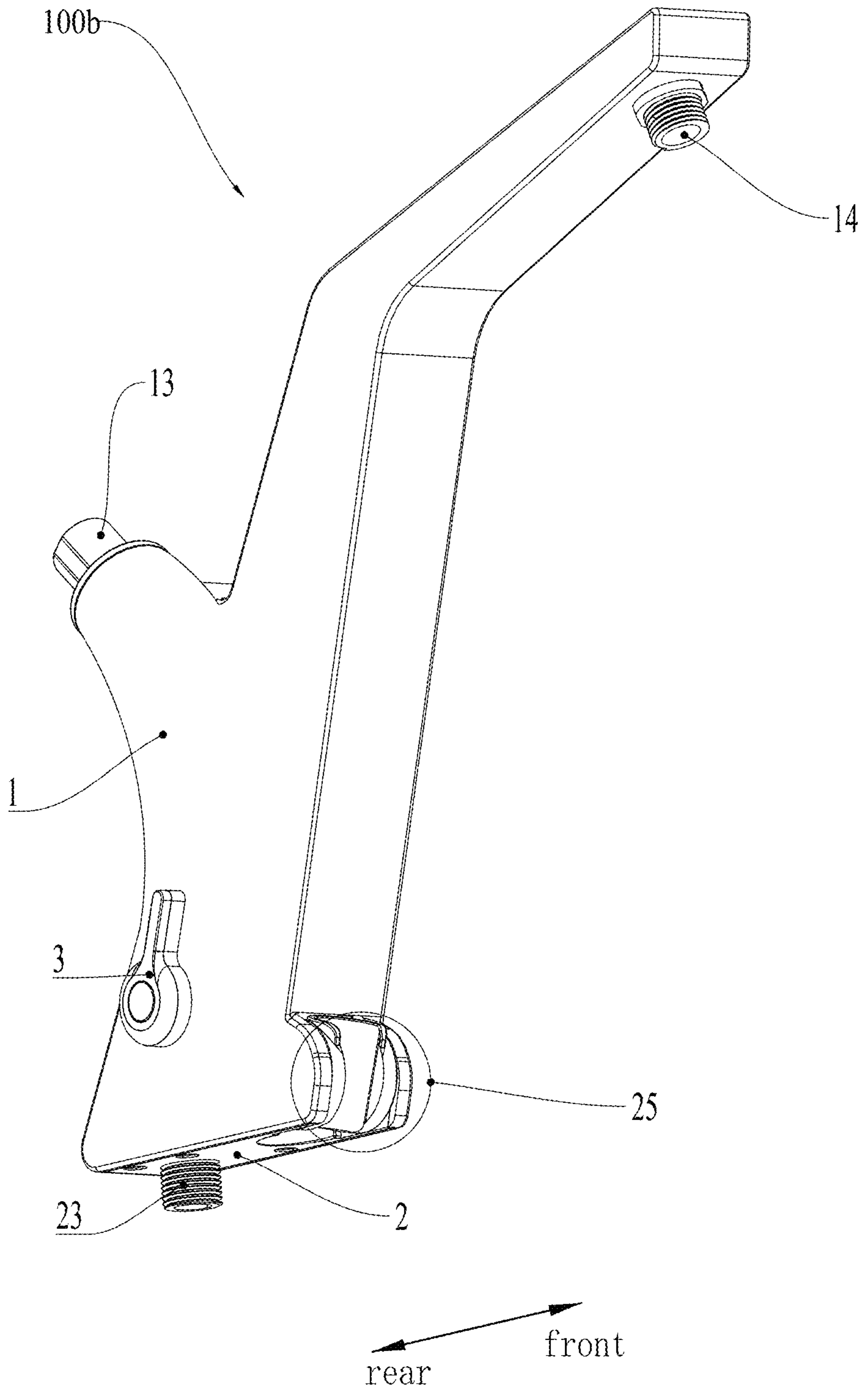
FIG. 2 is a perspective view of an overhead shower arm of the present application without a filter cartridge.

As shown in FIG. 2, the present application further discloses a design for an overhead shower arm 100*b* with a shower head holder 25 that eliminates the filter element 4. In the design, water entering the water inlet joint 13 does not need to be filtered by the filter element 4, but is instead directly fed through the first water passage 15 into the first water flow coupling 21 of the seat body 2. Reference may be made to the previous description for the structures of the arm 1, seat body 2, and actuator 3, which will not be repeated here.

The above description merely relates to embodiments of the present disclosure, and is not intended to limit the design of the present disclosure. Any equivalent changes made according to key points of the design of the present disclosure will fall within the scope of protection of the present disclosure.

What is claimed is:

1. An overhead shower arm with a shower head holder, comprising:

an arm, provided with a water inlet joint at its rear portion for connecting to a wall-mounted water outlet tube, wherein the arm is configured to be vertically mounted on the water outlet tube; a first water outlet joint for connecting to an overhead shower head is provided at a top portion of the arm, and an installation cavity with an opening, that opens downward and forward, is formed at a bottom portion of the arm;

a seat body, fixedly arranged within the installation cavity, wherein a first water flow coupling and a second water flow coupling are equipped at a top of the seat body, and a second water outlet joint is arranged at a bottom of the seat body; and a water path switching spool is arranged between the first water flow coupling, the second water flow coupling, and the second water outlet joint, and a shower head holder is arranged at a front portion of the seat body, for detachably receiving a handheld shower head; and an actuator, arranged on a side of the arm and connected to the water path switching spool, wherein a first water passage and a second water passage are further formed in an inner cavity of the arm, one end of the first water passage is in fluid communication with the water inlet joint, the other end of the first water passage is in fluid communication with the first water flow coupling, one end of the second water passage is in fluid communication with the first water outlet joint, and the other end of the second water passage is in fluid communication with the second water flow coupling, the water path switching spool is driven by the actuator to selectively fluidly communicate the first water flow coupling with the second water flow coupling or the second water outlet joint, or communicate the first water flow coupling with both the second water flow coupling and the second water outlet joint.

2. The overhead shower arm according to claim 1, wherein a filter element is connected in series with the arm in the first water passage, to allow all water flowing from the water inlet joint to the first water flow coupling to be filtered by the filter element.

3. The overhead shower arm according to claim 2, wherein the arm is composed of a front shell and a rear shell, and has a hollow inner cavity, a cylindrical body is horizontally arranged at a rear part of the rear shell, one end of the cylindrical body is an open end, and an other end of the cylindrical body is a closed end, a water baffle is provided in the cylindrical body on a side close to the closed end, such that a first water holding chamber is formed between the water baffle and the closed end of the cylindrical body, the water baffle is provided with at least a first water flow hole, the filter element is disposed into the cylindrical body through the open end, one end of the filter element facing the water baffle is a water inlet end, and an other end is a water outlet end, a screw cap seals the open end of the cylindrical body, to allow a space of the cylindrical body for placing the filter element to be defined as a second water holding chamber, a second water flow hole is provided in a tubular wall of the second water holding chamber, a water receiving channel is further provided in the rear shell, one end of the water receiving channel is connected to the second water flow hole, and an other end of the water receiving channel is connected to the first water flow coupling; the water inlet joint is convexly arranged on an outer wall of the cylindrical body opposite to the front shell, and the water flowing in through the water inlet joint flows through the first water holding chamber into the water inlet end of the filter element, and then flows out through the water outlet end of the filter element into the second water holding chamber, flows through the second water flow hole into the water receiving channel, and finally flows into the first water flow coupling; and the first water holding chamber, the first water flow hole of the water baffle, the second water holding chamber, the second water flow hole, and the water receiving channel together constitute the first water passage.

4. The overhead shower arm according to claim 3, wherein the front shell and the rear shell are secured together by a snap-fit connection.

5. The overhead shower arm according to claim 3, wherein the screw cap and an outer wall of the filter element form an interference fit, and rotating the screw cap and removing the screw cap from the open end of the cylindrical body allows the filter element to be removed with the screw cap.

6. The overhead shower arm according to claim 3, wherein a mounting boss is provided to protrude outward from the outer wall of the cylindrical body and on a side facing away from the front shell, the mounting boss is provided with a third water passage on a side thereof, the third water passage is in fluid communication with the first water holding chamber, and the water inlet joint is secured to the mounting boss.

7. The overhead shower arm according to claim 6, wherein the water inlet joint comprises a connector, a fixing seat, and a water flow positioning pin;

the mounting boss has a first countersunk hole in its middle portion, a first fastening hole is provided in the center of the first countersunk hole, and the third water passage is arranged on a side of the first countersunk hole adjacent to the first water holding chamber;

the fixing seat is fixedly connected to the mounting boss, a first through hole that penetrates axially is formed at a central axial portion of the fixing seat, and the first through hole is configured to allow the water flow positioning pin to pass through;

the connector passes through axially, an upper part of the connector is provided with an internal thread segment, and a lower part of the connector is provided with a bottom edge extending inwardly, and the bottom edge of the connector is placed on a top of the fixing seat, and the connector is designed to be coaxial with the first through hole;

an upper-middle part of an outer wall of the water flow positioning pin is provided with a first retaining edge protruding outward, and a middle-lower part of the outer wall of the water flow positioning pin is provided with a plurality of water flow grooves, and a central axial portion of the water flow positioning pin is provided with a fourth water passage that is in communication with an external water source, the fourth water passage is in fluid communication with the third water passage through the water flow grooves;

a support platform is provided at a bottom of the water flow positioning pin, the water flow positioning pin is sequentially inserted into the connector and the first through hole of the fixing seat until the support platform is against a bottom of the first countersunk hole, a first fastening screw passes through the support platform and is screwed into the first fastening hole to fix the water flow positioning pin, the first retaining edge of the water flow positioning pin is pressed against the bottom edge of the connector from top to bottom, to fix the connector to the top of the fixing seat.

8. The overhead shower arm according to claim 7, wherein a retaining ring is further provided on an outer wall of the water flow positioning pin, and the retaining ring is located below the first through hole of the fixing seat when in an assembled state.

9. The overhead shower arm according to claim 7, wherein an upper portion of the fixing seat is further provided with a flange, and the flange is provided with a plurality of second through holes, a top portion of the mounting boss is provided with second fastening holes at positions corresponding to the second through holes, a plurality of second set screws pass through the corresponding second through holes and are screwed into the second fastening holes respectively, to fixedly connect the fixing seat to the mounting boss.

10. The overhead shower arm according to claim 2, wherein the water path switching spool comprises an installation channel and a valve stem, the installation channel is arranged transversely at a lower side of the seat body below the first water flow coupling or the second water flow coupling, a cross section of an inner cavity of the installation channel is circular, two first sealing rings are sleeved on the valve stem to be spaced apart, and a plug is provided between the first sealing rings, the valve stem is inserted into the installation channel, to allow a space, between the two first sealing rings, of the installation channel to form a water collection chamber, an inner wall of the installation channel is provided with a first water outlet, a second water outlet and a third water outlet circumferentially at the water collection chamber, the first water outlet is in fluid communication with the first water flow coupling, the second water outlet is in fluid communication with the second water flow coupling, and the third water outlet is in fluid communication with the second water outlet joint, the actuator is a knob with a handle, rotating the knob drives the valve stem to rotate synchronously, allowing the plug of the valve stem to selectively block the second water outlet or the third water outlet, or to rest against the inner wall of the installation channel.

11. The overhead shower arm according to claim 10, wherein the installation channel runs through the seat body transversely, one end of the installation channel adjacent to the knob is provided with an arc-shaped limit block, and an other end of the installation channel serves as an insertion end, the valve stem is provided with a connecting block protruding outward at an end facing the knob, the connecting block is non-circular in shape, the connecting block is provided with a stop block protruding in a radial direction of the valve stem, the valve stem is inserted from the insertion end of the installation channel until it is restricted by the arc-shaped limit block; and the knob is threadedly secured to the connecting block by a third set screw, rotating the knob drives the valve stem to rotate synchronously, to allow the mutual position limiting between the stop block of the connecting block and two ends of the arc-shaped limit block to control an angular range of the knob's rotation.

12. The overhead shower arm according to claim 11, wherein the installation channel is provided transversely with three positioning notches on its inner wall, these three positioning notches correspond to the second water outlet, the third water outlet, and the inner wall on a side away from the second water outlet respectively; and a spring-loaded positioning terminal is provided on a radial end of the valve stem, rotating the knob drives the valve stem to rotate, causing the positioning terminal to switch between different positioning notches, and emit a positioning sound in the process of switching.

13. The overhead shower arm according to claim 10, wherein the second water outlet joint is composed of a connecting column and a connecting part from top to bottom, an inner cavity of the connecting column and an inner cavity of the connecting part are in communication with each other, an upper segment of the connecting column has two annular protrusions spaced apart and arranged on an outer peripheral wall of the connecting column, and is defined as a retaining segment, and the connecting part is provided with an external thread segment; and a bottom of the seat body is provided with a socket, and a third water holding chamber is formed between the socket and the third water outlet, a side of the seat body is provided with a hollowed out portion at a position corresponding to the third water holding chamber, a water-sealing side cover has a U-shaped insert extending toward the third water holding chamber, the connecting column is inserted through the socket and extends into the third water holding chamber, the water-sealing side cover seals the hollowed-out portion by ultrasonic welding, the U-shaped insert abuts against the retaining segment of the connecting column, up-down position-limiting through the U-shaped insert and the two annular protrusions retains the second water outlet joint to the bottom of the seat body.

14. The overhead shower arm according to claim 1, further comprising a handheld shower head that is in fluid communication with the second water outlet joint, wherein the shower head holder is configured with a socket structure or a magnetic attraction structure to allow the handheld shower head to be detachably placed on the shower head holder.

15. The overhead shower arm according to claim 3, further comprising a handheld shower head that is in fluid communication with the second water outlet joint, wherein a recessed portion is formed on a front-end surface of the front shell and positioned above the shower head holder, a depth of the recessed portion being configured to correspond to a thickness of the handheld shower head, and wherein, when the shower head holder is configured with a socket structure, the socket structure includes an angle-adjustment function.

16. The overhead shower arm according to claim 3, wherein the rear shell is provided with at least two downwardly extending screw posts protruding from a portion of the rear shell below the outer wall of the cylindrical body, and positioning through holes are provided at the bottom of the seat body at positions corresponding to the screw posts, and fourth set screws of a same quantity as the screw posts pass through the positioning through holes in sequence and are locked to the screw posts to fix the seat body to the rear shell.

17. The overhead shower arm according to claim 16, wherein an inner wall of the rear shell is provided with two guide positioning plates protruding forward in a vertical direction in a region corresponding to the installation cavity, a rear portion of the seat body is recessed inward from top to bottom to form a limit groove, and the limit groove and the two guide positioning plates cooperate to vertically guide and position the seat body.

* * * * *